(12) United States Patent
Juri et al.

(10) Patent No.: US 6,744,928 B1
(45) Date of Patent: Jun. 1, 2004

(54) VARIABLE-LENGTH DECODING METHOD AND APPARATUS EMPLOYING CODE LENGTH AND A RECORDING MEDIUM

(75) Inventors: Tatsuro Juri, Osaka (JP); Tadashi Ono, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/380,794

(22) PCT Filed: Mar. 10, 1998

(86) PCT No.: PCT/JP98/00969

§ 371 (c)(1),
(2), (4) Date: Sep. 9, 1999

(87) PCT Pub. No.: WO98/41026

PCT Pub. Date: Sep. 17, 1998

(30) Foreign Application Priority Data

| Mar. 12, 1997 | (JP) | ................................. 9-057278 |
| Jun. 4, 1997 | (JP) | ................................. 9-146703 |
| Jun. 20, 1997 | (JP) | ................................. 9-163971 |
| Jul. 16, 1997 | (JP) | ................................. 9-190845 |

(51) Int. Cl.$^7$ .............................. G06K 9/36; G06K 9/46
(52) U.S. Cl. .................... 382/246; 382/250; 382/253
(58) Field of Search .................................. 382/232, 233, 382/244, 245, 246, 250, 251, 253; 375/240.01, 240.03, 240.16, 240.2, 240.22, 240.25, 240.23; 341/65, 67

(56) References Cited

U.S. PATENT DOCUMENTS

| 5,600,812 | A | * | 2/1997 | Park ........................... 711/200 |
| 5,604,498 | A | * | 2/1997 | Park ........................... 341/65 |
| 5,619,200 | A | * | 4/1997 | Huang ........................ 341/67 |
| 5,663,725 | A | * | 9/1997 | Jang ........................... 341/67 |
| 5,748,790 | A | * | 5/1998 | Golin ........................ 382/246 |
| 5,781,135 | A | * | 7/1998 | Kim et al. .................... 341/67 |
| 5,786,780 | A | * | 7/1998 | Park et al. .................... 341/67 |
| 5,835,035 | A | * | 11/1998 | Bakhmutsky ................. 341/67 |
| 5,852,469 | A | * | 12/1998 | Nagai et al. ............. 375/240.23 |
| 5,862,153 | A | * | 1/1999 | Kikuchi et al. .............. 714/775 |
| 5,973,627 | A | * | 10/1999 | Bakhmutsky ................. 341/67 |
| 6,104,754 | A | * | 8/2000 | Chujoh et al. .......... 375/240.23 |

FOREIGN PATENT DOCUMENTS

| JP | 55-79565 A | 6/1980 | ............ H04N/1/40 |
| JP | 62-172885 A | 7/1987 | ............ H04N/7/133 |
| JP | 2-14672 A | 1/1990 | ............ H04N/1/41 |
| JP | 2-154571 A | 6/1990 | ............ H04N/1/415 |
| JP | 2-224489 A | 9/1990 | ............ H04N/7/133 |
| JP | 3-151763 A | 6/1991 | ............ H04N/1/41 |
| JP | 4-7976 A | 1/1992 | ............ H04N/1/41 |
| JP | 4-51720 | 2/1992 | ............ H03M/7/40 |
| JP | 4-178087 A | 6/1992 | ............ H04N/7/133 |
| JP | 4-192744 A | 7/1992 | ............ H04L/25/497 |
| JP | 5-40777 A | 2/1993 | ............ G06F/15/332 |
| JP | 5-183756 A | 7/1993 | ............ H04N/1/41 |
| JP | 5-227442 A | 9/1993 | ............ H04N/1/41 |

* cited by examiner

*Primary Examiner*—Andrew W. Johns
*Assistant Examiner*—Amir Alavi
(74) *Attorney, Agent, or Firm*—Smith, Gambrell & Russell, LLP

(57) ABSTRACT

The present invention includes methods and apparatus for attaining high speed coding and decoding. A first method decreases the number of memory access times by performing signal format conversion, orthogonal transform and continuous variable-length coding with predetermined small areas in a frame used as units. A second method omits orthogonal transform computation by using orthogonal transform coefficients to shorten the processing time. A third method uses additions and subtractions for orthogonal transform thereby decreasing the number of registers used and reducing the number of memory access times. The present invention further includes a decoding method for variable-length decoding wherein table size is not made larger because the number of table access times per code word is set to a maximum of 2, and plural code words are decoded by one tale access operation to attain high-speed decoding.

25 Claims, 37 Drawing Sheets

Fig. 14

| First table output | | | Code word to be obtained | Second table | | |
|---|---|---|---|---|---|---|
| Code length | Mask pattern | Offset value (f) | Masked value (f)' | Input address (f + t) | Zero run | Value |
| 9 | 11111 | 0 | 1110 00000 | 0 | 7 | 1 |
| | | | 1110 00001 | 1 | 7 | -1 |
| | | | ⋮ | ⋮ | ⋮ | ⋮ |
| | | | 1110 11110 | 30 | 0 | 17 |
| | | | 1110 11111 | 31 | 0 | -17 |
| 10 | 11111 | 32 | 11110 00000 | 32 | 11 | 1 |
| | | | 11110 00001 | 33 | 11 | -1 |
| | | | ⋮ | ⋮ | ⋮ | ⋮ |
| | | | 11110 11110 | 62 | 0 | 22 |
| | | | 11110 11111 | 63 | 0 | -22 |
| 11 | 1111 | 64 | 1111100 0000 | 64 | 5 | 3 |
| | | | ⋮ | ⋮ | ⋮ | ⋮ |
| | | | 1111100 1111 | 79 | 1 | 0 |
| 12 | 1111 | 80 | 11111010 0000 | 80 | 6 | 3 |
| | | | ⋮ | ⋮ | ⋮ | ⋮ |
| | | | 11111010 1111 | 95 | 5 | 0 |
| 13 | 11111 | 96 | 11111011 00000 | 96 | 7 | 2 |
| | | | 00001 | 97 | 7 | -2 |
| | | | ⋮ | ⋮ | ⋮ | ⋮ |
| | | | 11111011 11110 | 126 | 1 | 17 |
| | | | 11111011 11111 | 127 | 1 | -17 |

Fig. 26
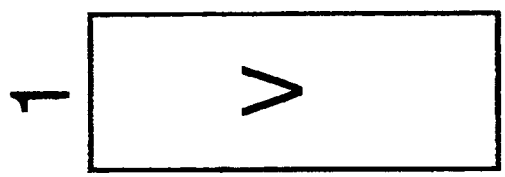
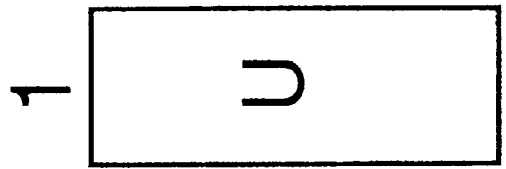
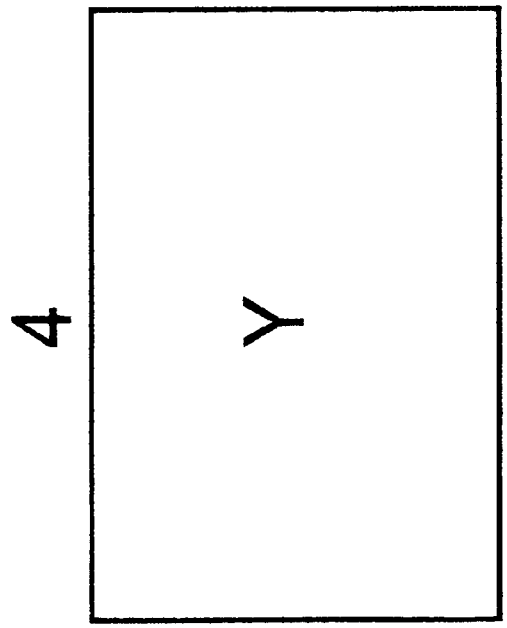

Fig. 29

VARIABLE-LENGTH DECODING METHOD AND APPARATUS EMPLOYING CODE LENGTH AND A RECORDING MEDIUM

FIELD OF THE INVENTION

The present invention relates to according method, a coding apparatus and a recording medium for coding input image data, and to a decoding method, a decoding apparatus and a recording medium for decoding coded image data.

RELATED ART

In accordance with the improvement in digital signal processing technology, apparatuses capable of compressing, coding and recording digital image signals and capable of decoding, decompressing and reproducing digital image signals have been accomplished; and DVC (Digital Video Cassette) can be taken as an example. The format of the DVC is described in the Specifications of "Consumer-Use Digital VCRs using 6.3 mm magnetic tape" compiled by the HD Digital VCR Association.

In digital image apparatuses including DVC, since the amount of input image data is large, the amount of data is decreased by compression and coded, and the coded image data is decoded so as to be reconstructed to original images by decoding, as a general practice.

FIG. 25 is a block diagram illustrating the configuration of a coding portion in a conventional digital image apparatus. In FIG. 25, the numeral 2501 represents a first input terminal, the numeral 2502 represents a first signal format conversion portion, the numeral 2503 represents a switch, the numeral 2504 represents a second input terminal, the numeral 2505 represents a second signal format conversion portion, the numeral 2506 represents a shuffling portion, the numeral 2507 represents an orthogonal transform portion, the numeral 2508 represents a variable-length coding portion, and the numeral 2509 represents a coded image output terminal.

An example of an image signal to be coded for recording is a YUV 422 component signal comprising a luminance (Y) signal, a first color difference (U) signal and a second color difference (V) signal in a ratio of 4:2:2. When this YUV 422 component signal is input from the first input terminal 2501, it is converted into a YUV 411 component signal (hereinafter referred to as a YUV format signal) comprising four Y signals, one U signal and one V signal as the number of pixels per frame by the first signal format conversion portion 2502 as shown in FIG. 26.

On the other hand, an image signal other a YUV format signal, for example, a digital RGB component signal (hereinafter referred to as an RGB format signal) comprising a red (R) signal, a green (G) signal and a blue (G) signal may sometimes become an input signal. In this case, the RGB format signal input from the second input terminal 2504 is required to be converted into a YUV format signal by the second signal conversion portion 2505. The RGB format signal has horizontal pixels in the ratio of 4:4:4 per frame as shown in FIG. 27. In the second signal format conversion portion 2505, by using the RGB pixel values on the respective coordinates, $$Y=0.30R+0.59G+0.11B$$

$$U=0.70R-0.59G-0.11B$$

$$V=-0.30R-0.59G+0.89B$$

are obtained; furthermore, the numbers of the horizontal pixels of the U and V signals were thinned out to ¼ to obtain a YUV format signal.

The YUV format signal obtained by the second signal format conversion portion 2505 is supplied to the shuffling portion 2506 via the switch 2503, and processed hereinafter in the same way as described above.

The Y signal, U signal and V signal of the YUV signal sent tothe shuffling portion 2506 are each divided into a block comprising M horizontal pixels and N vertical pixels (usually, M=N=8). Four blocks of Y signal, one block of U signal and one block of V signal located in the same region of a display screen are defined as a macro block. By using this macro block as a unit, a sync block used as a coding unit is formed of five macro blocks located at separate positions in a frame as shown in FIG. 28.

The shuffled image signal is sent to the orthogonal transform portion 2507, and subjected to orthogonal transform (usually, discrete cosine transform) in block units. The image signal subjected to orthogonal transform is sent to the variable-length coding portion 2508, and coded so that the amount of codes in the above-mentioned sync block is not more than a specific value. By carrying out the above-mentioned shuffling, the amount of codes required for each sync block is averaged for the entire frame, and coding can be carried out efficiently; furthermore, even if errors remain during reproduction, they disperse on the whole display screen, whereby the errors become less conspicuous. The coded image signal is output from the coded image output terminal 2509.

The variable-length coding portion carries out variable-length coding for a set of zero run, i.e., the number of continuous 0s, and value, i.e., the value of non-zero coefficient following the zero run, for the coefficient string subjected to orthogonal transform. FIG. 29 is a variable-lengthcoding table for DVC.

In the variable-length code for DVC, the code length is 3 bits or more and 16 bits or less, and the code length is determined uniquely by its high-order 8 bits. Furthermore, it is characterized that a code word having a shortercode length is assigned as the probability of occurrence is higher. The end of a series of code words is referred to as EOB.

Variable-length coding operation will be described below by using FIGS. 29 and 30.

It is assumed that coding has been completed up to coefficient A (coefficient value 9) in FIG. 30. The portions to be coded next are 3 continuous 0s and non-zero coefficient 2 (coefficient group B) following thereto. At this time, the zero run is 3, and the value is 2. According to FIG 29, the coefficient group B is coded as "111001000."

Following the coefficient group B, coefficient C located immediately after the coefficient group B is coded. Since "0" is not present between the coefficient group B and the coefficient C, the zero run is 0 at this time. Since the value is −6, the coefficient C is coded to "101111" according to FIG. 29.

FIG. 31 is a block diagram illustrating decoding for decoding variable-length coded image signals to obtain an ordinary image signal. In FIG. 31, the numeral 3101 represents a coded image input terminal, the numeral 3102 represents a variable-length decoding portion, the numeral 3103 represents an inverse orthogonal transform portion, the numeral 3104 represents a deshuffling portion, the numeral 3105 represents a first signal format conversion portion, the numeral 3106 represents a first signal output terminal, the numeral 3107 represents a second signal format conversion portion, and the numeral 3108 represents a second signal output terminal.

A coded image signal (a code word string) having been input to the coded image input terminal 3101 is decoded by the variable-length decoding portion 3102. In the case when a code word string is decoded according to the variable-length coding table of FIG. 29, the following methods can be considered.

A first method is a method wherein a code word string is scanned bit by bit until its code length (code word) is determined, and the zero run and value of the determined code word are output referring to the table. This method will be described by using FIG. 32.

In FIG. 32, 3-bit data from the head of a code word is taken as a candidate, and a judgment as to whether the code length is determined is made (corresponding to the description indicated by code a in FIG. 32). If the code length is not determined, a code word additionally having the next 1-bit data is taken as a candidate, and a judgment as to whether the code length is determined is made (corresponding to the description indicated by code b in FIG. 32). This operation is repeated until the code length is determined, whereby the code word is determined (corresponding to the description indicated by code c in FIG. 32).

Next, the table is made reference to with respect to the determined code word, and its zero run and value are obtained (corresponding to the description indicated by code d in FIG. 32).

As a result, one codeword has been decoded; therefore, the amount of the code word (7 bits in this case) is deleted from the head of the code word string, and the head of the next code word is taken out.

The above-mentioned operation is repeated until the EOB appears again. (Variable-length decoding method 1)

As a second method, a method of preparing a table for all code words can be used. In the case of DVC, since the maximum code length is 16, decoding can be carried out immediately by referring to a table wherein 16-bit data is input, and the code length, zero run and value corresponding to each bit pattern are output as shown in FIG. 33 (variable-length decoding method 2).

Data subjected to variable length decoding is decoded into the YUV format signal in block units by the inverse orthogonal transform portion 3103. After this, operation opposite to shuffling is carried out by the deshuffling portion 3104, and the signal is converted into a YUV 422 component signal, for example, by the first signal format conversion portion 3105, and output from the first signal output terminal 3106. On the other hand, when an RGB format signal is output, an RGB format signal is obtained from a YUV format signal by the second signal format conversion portion 3107, and output from the second signal output terminal 3108.

The above-mentioned process can also be carried out by using an arithmetic processing apparatus, such as a computer. In other words, by implementing the above-mentioned coding and decoding processing via software, the processing can be done by using a computer wherein an external memory 3401, a CPU 3402 comprising a cache memory, registers and an arithmetic unit, and a hard disk 3404 are connected to one another via a data bus 3403 as shown in FIG. 34. By this implementation of the coding and decoding processing via software, image data on a recording medium, such as a hard disk, connected to the computer can be coded and recorded on DVC; and coded image data recorded on DVC can be directly taken in the computer and subjected to decoding processing so as to be indicated on a monitor connected to the computer.

However, when the above-mentioned coding and decoding are carried out by using a computer, the following problems occur.

When image data is coded, or coded image data is decoded by using a computer, an enormous amount of data is required to be computed in a very short time.

For example, when an NTSC image signal is coded or decoded, (1) during coding, it is necessary to carryout signal format conversion, orthogonal transform and variable-length coding for 1-frame image data comprising 720 horizontal pixels and 480 vertical pixels within ⅟30 second, and (2) during decoding, it is necessary to carry but variable-length decoding, inverse orthogonal transform and signal format conversion for coded 1-frame image data within ⅟30 second. Otherwise, coding and decoding cannot be accomplished in real time without frame dropout.

When an RGB format signal is input, and when the coding processing shown in FIG. 25 is carried out by using a computer, the flow of data is shown in FIG. 35. The input RGB format signal is mapped in an area of the external memory 3401 (corresponding to the dotted line indicated by the numeral 3551). The mapped RGB format signal is transferred to the CPU 3402 (3552), subjected to computation for converting the signal into a YUV format signal (3553), and written once to another area of the external memory 3401 (3554). Next, in accordance with the addresses obtained depending on a shuffling pattern, the image signal is read from the external memory 3401 in block units, transferred to the CPU 202 (3555), and subjected to orthogonal transform and vertical-length coding (3556), whereby a coded image signal is output via the data bus 3403 (3557).

When the decoding processing shown in FIG. 31 is carried out by using a computer, the coded image signal transferred via the data bus 3403 is taken in the CPU 3402 (corresponding to the dotted line indicated by the numeral 3651 in FIG. 36), subjected to variable-length decoding and inverse orthogonal transform (3652), and transferred once to the external memory 3401 to carry out deshuffling (3653) as shown in FIG. 36. Next, in accordance with the addresses obtained depending on a deshuffling pattern, the signal is transferred from the external memory 3401 to the CPU 3402 so as to be subjected to signal format conversion (3654), and converted into an RGB format signal by the CPU 3402 (3655), and transferred again to the external memory 3401 (3656). By mapping the image signal stored in the external memory 3401 over a display device, such as a VRAM, image display and recording can be carried out.

Data transfer between the external memory 3401 and the CPU 3402 usually takes a longer time than data transfer between the registers or between the cache memory and the registers inside the CPU. In the conventional example, data transfer is carried out four times between the external memory 3401 and the CPU 3402, and this may impair real time image processing depending on the architecture of the computer.

Next, in the case of coding and decoding using orthogonal transform, it is necessary to carry out orthogonal transform for both coding and decoding. However, since the orthogonal transform used for ordinary image signals is formed of complicated computation including multiplication of irrational numbers, a very long computation time or a large circuit is required.

Even the conventional example frequently uses butterfly computation wherein the sum and difference of two inputs are computed, in order to increase the speed of orthogonal transform computation. In this butterfly computation for two inputs, $X_0$ and $X_1$, an output value $Y_0$, i.e., $X_0+X_1$, and an output value $Y_1$, i.e., $X_0-X_1$, are computed. This computation is processed as described below when carried out on a computer.

(1) Input value X0 is set in register A.
(2) Input value X1 is set in register B.
(3) The output (X1) of register B is set in register C (a copy of X1 is created).
(4) The output (X0) of register A is added to the output (X1) of register B, and the result is set in register B (the computation of X0+X1).
(5) The output (X1) of register C is subtracted from the output (X0) of register A, and the result is set in register A (the computation of X0−X1).
(6) The output of register B is output as Y0.
(7) The output of register A is output as Y1.

Although the butterfly computation is a very simple computation as described above, it requires at least three registers when computation is carried out to obtain two computation outputs.

On the other hand, eight-dimensional orthogonal transform is frequently used for image coding, and in this case, it is necessary to carry out four sets of 2-input butterfly computations simultaneously. For this purpose, 12 registers are necessary in total.

However, Intel's CPUs, most abundantly used in personal computers, have less number of registers; even the newest MMX-compatible CPU has only four integer registers and eight MMX registers. To compensate for lack of registers, data in some registers is saved on memory. Since the above-mentioned butterfly computation is carried out repeatedly for orthogonal transform, saving of register values on memory occurs frequently, thereby delaying execution time significantly.

As described above, the saving on memory at the time of butterfly computation causes a serious problem of increasing computation time for coding and decoding image signals and audio signals.

Furthermore, when the above-mentioned variable-length decoding method 1 and the variable-length decoding method 2 are programmed for variable-length decoding and executed by using a computer, the following problems occur.

In the case of the variable-length decoding method 1, it is necessary to use a branch instruction for judging whether a code word is determined at each scanning or not. However, when Intel's Pentium, a dominant CPU in today's computers, is used, each time a branch instruction is executed, processing information for high-speed processing, obtained before the branch information, is cleared. Therefore, the above-mentioned processing information must be obtained to carry out the following computation, and during this time, processing is interrupted. In the case of variable-length decoding for DVC, when scanning is carried out in bit units, a branch instruction must be executed 11 times at the maximum and three times on the average for one code word.

On the other hand, in the case of the variable-length decoding method 2, the required size of the table is required to hold three parameters, i.e., code length, zero run and value, for each input bit pattern. When it is assumed that each of these three parameters has 1 bit, the size of the table becomes $3 \times 2^{16} = 192$ Kbytes. However, since the size of the cache memory built in the CPU is about 16 Kbytes in the case of the newest Pentium, the table described in the variable-length decoding method 2 cannot be stored wholly in the above-mentioned cache memory. For this reason, the content of the table to be made reference to is highly likely not to be stored in the cache memory. If the content of the table is not included in the cache memory, it must be transferred from the external memory to the cache memory, whereby processing time is extended significantly.

Even in both cases, problems occur because of the difficulty in carrying out the conventional coding and decoding in real time by using a computer.

DISCLOSURE OF THE INVENTION

In consideration of the conventional problems, the present invention is intended to provide a high-speed coding method, coding apparatus and coding program for carrying out coding by dividing input image data having a predetermined signal format into block units and by carrying out orthogonal transform in the above-mentioned block units, as well as a high-speed decoding method, decoding apparatus and decoding program for obtaining image data by subjecting coded data to inverse orthogonal transform and signal format conversion.

To achieve the above object, the present invention of claim 1 is a coding method for coding input image data in a predetermined signal format by dividing said image data into block units and by carrying out orthogonal transform in said block units, comprising:

a macro block forming step for forming a macro block from said plural blocks, a signal format conversion step for converting said image data in said predetermined signal format into image data in another signal format, an orthogonal transform step for orthogonally transforming said image data subjected to said signal format conversion, and a coding step for coding the output of said orthogonal transform step, wherein said signal format conversion step, said orthogonal transform step and said coding step are carried out continuously in said macro block units.

The present invention of claim 4 is a coding method in accordance with claim 1, wherein said input image data comprises red, green and blue signals, and image data obtained after said signal format conversion comprises luminance, first color difference and second color difference signals.

The present invention of claim 7 is a coding method in accordance with claim 1, wherein said input image data comprises luminance, first color difference and second color difference signals, and image data obtained after said signal format conversion comprises luminance, first color difference and second color difference signals having a configuration different from that before said conversion.

The present invention of claim 10 is a coding method for coding input image data in a predetermined signal format by dividing said image data into block units and by carrying out orthogonal transform in said block units, comprising:

a pixel value detection step for detecting input pixel values in said block and for judging whether all the pixel values in said block are identical or nearly identical or not, and an orthogonal transforming step, wherein, in a block judged by said pixel value detection step that all the pixel values are identical or nearly identical, DC coefficient component values are generated from the value of one pixel in said block, and all AC coefficient component values are set to zero, and in other blocks, ordinary orthogonal transform computation is carried out.

The present invention of claim 13 is a coding method for coding input image data in a predetermined signal format by dividing said image data into block units and by carrying out orthogonal transform in said block units, assuming that either the horizontal direction or the vertical direction is referred to as a first direction and the other is referred to as a second direction, and that said two-dimensional block has m×n pixels comprising m pixels in said first direction and n pixels in said second direction, said method comprising:
   a first orthogonal transform step for orthogonally transforming said input pixel values in said two-dimensional block in m pixel units in said first direction,
   a pixel value detection step for detecting coefficient component values obtained at said first orthogonal transform step in n coefficient units in said second direction, and
   a second orthogonal transforming step, wherein, in coefficients, detected by said pixel value detection step, comprising said n coefficients in said second direction and having identical or nearly identical coefficient values, DC coefficient component values are generated from the value of one coefficient in said n coefficients, and all AC coefficient component values are set to zero, and in others of said n coefficients, ordinary orthogonal transform computation is carried out.

The present invention of claim 16 is a coding method for coding input image data in a predetermined signal format by dividing said image data into block units and by carrying out orthogonal transform in said block units, assuming that either the horizontal direction or the vertical direction is referred to as a first direction and the other is referred to as a second direction, and that said two-dimensional block has m×n pixels comprising m pixels in said first direction and n pixels in said second direction, said method comprising:
   a first orthogonal transform step for orthogonally transforming said input pixel values in said two-dimensional block in m pixel units in said first direction,
   a pixel value detection step for detecting coefficient component values obtained at said first orthogonal transform step in n coefficient units in said second direction, and
   a second orthogonal transforming step, wherein, in coefficients, detected by said pixel value detection step, comprising said n coefficients in said second direction and having coefficient values, all of which are 0 or nearly 0, DC coefficient component values for said n coefficients and all AC coefficient component values are set to zero, and in others of said n coefficients, ordinary orthogonal transform computation is carried out.

The present invention of claim 22 is a coding method for coding input image data in a predetermined signal format by dividing said image data into block units and by carrying out orthogonal transform in said block units.

at the time when output value Y0, i.e., X0+X1, and output value Y1, i.e., X0−X1, are generated from two input values X0 and X1 by at least orthogonal transform computation, said method comprising:
   first, an addition step for adding said X0 to said X1 to generate new X1,
   second, a doubling step for doubling said X0 to generate new X0, and
   third, a subtraction step for subtracting said new X1 from said new X0 to generate newer X0, wherein
   said new X1 is used as output value Y0, and said newer X0 is used as output value Y1.

The present invention of claim 25 is a coding method for coding input image data in a predetermined signal format by dividing said image data into block units and by carrying out orthogonal transform in said block units, at the time when output value Y0, i.e., X0+X1, and output value Y1, i.e., X0−X1, are generated from two input values X0 and X1 by at least orthogonal transform computation, said method comprising:
   first, a subtraction step for subtracting said X1 from said X0 to generate new X0,
   second, a doubling step for doubling said X1 to generate new X1, and
   third, an addition step for adding said new X0 to said new X1 to generate new X1, wherein
   said new X1 is used as output value Y0, and said newer X0 is used as output value Y1.

The present invention of claim 28 is a coding method for coding input image data in a predetermined signal format by dividing said image data into block units and by carrying out orthogonal transform in said block units, at the time when output value Y0, i.e., X0+X1, and output value Y1, i.e., X0−X1, are generated from two input values X0 and X1 by at least orthogonal transform computation, said method comprising:
   first, a first addition step for adding said X0 to said X1 to generate news X1,
   second, a second addition step for adding said X0 to said X0 to generate new X0, and
   third, a subtraction step for subtracting said new X1 from said new X0 to generate newer X0, wherein
   said new X1 is used as output value Y0, and said newer X0 is used as output value Y1.

The present invention of claim 31 is a coding method for coding input image data in a predetermined signal format by dividing said image data into block units and by carrying out orthogonal transform in said block units, at the time when output value Y0, i.e., X0+X1, and output value Y1, i.e., X0−X1, are generated from two input values X0 and X1 by at least orthogonal transform computation, said method comprising:
   first, a subtraction step for subtracting said X1 from said X0 to generate new X0,
   second, a first addition step for adding said X1 to said X1 to generate new X0, and
   third, a second addition step for adding said new X0 to said new X1 to generate new X1, wherein
   said new X1 is used as output value Y0, and said newer X0 is used as output value Y1.

The present invention of claim 34 is a coding method for coding input image data in a predetermined signal format by dividing said image data into block units and by carrying out orthogonal transform in said block units, at the time when output value Y0, i.e., X0+X1, and output value Y1, i.e., X0−X1, are generated from two input values X0 and X1 by at least orthogonal transform computation, said method comprising:
   first, a first addition step for adding said X0 to said X1 to generate new X1, second, a shifting step for shifting said X0 used as a binary number by one bit to the MSB side to generate new X0, and third, a subtraction step for subtracting said new X1 from said new X0 to generate newer X0, wherein said new X1 issued as output value Y0, and said newer X0 is used as output value Y1.

The present invention of claim 37 is a coding method for coding input image data in a predetermined signal format by dividing said image data into block units and by carrying out orthogonal transform in said block units, at the time when output value Y0, i.e., X0+X1, and output value Y1, i.e., X0−X1, are generated from two input values X0 and X1 by at least orthogonal transform computation, said method comprising:
first, a subtraction step for subtracting said X1 from said X0 to generate new X0, second, a shifting step for shifting said X1 used as a binary number by one bit to the MSB side to generate new X1, and third, a second addition step for adding said new X0 to said new X1 to generate new X1, wherein said new X1 is used as output value Y0, and said newer X0 is used as output value Y1.

The present invention of claim 40 is a decoding method for subjecting coded data to variable-length decoding, inverse orthogonal transform and signal format conversion to obtain image data, at the time when the maximum code word length per code word for said coded data is n (n: a natural number), said variable-length decoding step comprising:
(1) a first table reference step for referring to a first table by using j-bit data of said code word as an input, for outputting code-length-related information and decoded data from said first table when code length s is j or less, and for outputting code-length-related information and second table access information when code length s is j+1 or more, and (2) a second table reference step for computing a second table address from said second table access information and said s-bit data of said code word, for referring to said second table in accordance with said second table address, and for outputting decoded data.

The present invention of claim 43 is a decoding method for subjecting coded data to variable-length decoding, inverse orthogonal transform and signal format conversion to obtain image data, at the time when said coded data is a code word string subjected to variable length coding, the maximum code word length per code word of which is n (n: a natural number), said variable-length decoding step comprising:
(1) a code word string obtaining step for obtaining j-bit data from the head of said code word string, (2) a first table reference step for referring to a first table by using said obtained j-bit data as an input, for outputting code-length-related information and decoded data from said first table when code length s is j or less, and for outputting code-length-related information and second table access information from said first table when code length s is j+1 or more, (3) a second table reference step for obtaining s-bit data from the head of said code word string, for computing a second table address from said second table access information and said s-bit data, for referring to said second table in accordance with said second table address, and for outputting decoded data, and (4) a bit shifting step for obtaining code length s from said code-length-related information, for deleting the s-bit code from the head of said code word string, and for repeating this operation until the occurrence of an end code.

The present invention of claim 46 is a decoding method for subjecting coded data to variable-length decoding, inverse orthogonal transform and signal format conversion to obtain image data, at the time when said coded data is a code word string subjected to variable-length coding, the maximum code word length per code word of which is in (n: a natural number), said variable-length decoding step comprising:
(1) a code word string obtaining step for obtaining j-bit data from the head of said code word string, (2) an expansion first table reference step, wherein a first table is made reference to by using said obtained j-bit data as an input, and when the sum of the code lengths of k or less continuous code words is j or less, code-length-related information for said k continuous code words and decoded data for each of said k or less continuous code words are output from said first table, and when code length s is j+1 or more, code-length-related information and second table access information are output from said first table, and (3) a second table reference step for obtaining s-bit data from the head of said code word string, for computing a second table address from said second table access information and said s-bit data, for referring to said second table in accordance with said second table address, and for outputting decoded data.

The present invention of claim 49 is a decoding method for subjecting coded data to variable-length decoding, inverse orthogonal transform and signal format conversion to obtain image data, at the time when said coded data is a code word string subjected to variable-length coding, the maximum code word length per code word of which is n (n: a natural number), said variable-length decoding step comprising:
(1) a code word string obtaining step for obtaining j-bit data from the head of said code word string, (2) a first table reference step, wherein a first table is referred to by using said obtained j-bit data as an input, when the sum of the code lengths of m or less continuous code words is j or less, and when the sum of the code lengths of said m continuous code words and the code word next to said m continuous code words is determined uniquely, information relating to the total code length of said m continuous code words and the code word next to said m continuous code words, decoded data for each of said m or less continuous code words, and second table access information regarding said code word next to said m continuous code words are output from said first table, and (3) a second table reference step for gaining access to a second table by using said second table access information as an input and for outputting decoded data regarding said code word next to said m continuous code words.

The present invention of claim 73 is a decoding method for subjecting coded data to inverse orthogonal transform and signal format conversion to obtain image data, at the time when output value Y0, i.e., X0+X1, and output value Y1, i.e., X0−X1, are generated from two input values X0 and X1 by at least inverse orthogonal transform computation, said method comprising:
first, an addition step for adding said X0 to said X1 to generate new X1,
second, a doubling step for doubling said X0 to generate new X0, and
third, a subtraction step for subtracting said new X1 from said new X0 to generate newer X0, wherein
said new X1 is used as output value Y0, and said newer X0 is used as output value Y1.

The present invention of claim 76 is a decoding method for subjecting coded data to inverse orthogonal transform and signal format conversion to obtain image data, at the time when output value Y0, i.e., X0+X1, and output value Y1, i.e., X0−X1, are generated from two input values X0 and X1 by inverse orthogonal transform computation and the like, said method comprising:
first, a subtraction step for subtracting said X1 from said X0 to generate new X0,
second, a doubling step for doubling said X1 to generate new X1, and
third, an addition step for adding said new X0 to said new X1 to generate new X1, wherein
said new X1 is used as output value Y0, and said newer X0 is used as output value Y1.

The present invention of claim 79 is a decoding method for subjecting coded data to inverse orthogonal transform and signal format conversion to obtain image data, at the time when output value Y0, i.e., X0+X1, and output value Y1, i.e., X0−X1, are generated from two input values X0 and X1 by atleast inverse orthogonal transform computation, said method comprising:
first, a first addition step for adding said X0 to said X1 to generate new X1,
second, a second addition step for adding said X0 to said X0 to generate new X0, and
third, a subtraction step for subtracting said new X1 from said new X0 to generate newer X0, wherein
said new X1 is used as output value Y0, and said newer X0 is used as output value Y1.

The present invention of claim 82 is a decoding method for subjecting coded data to inverse orthogonal transform and signal format conversion to obtain image data, at the time when output value Y0, i.e., X0+X1, and output value Y1, i.e., X0−X1, are generated from two input values X0 and X1 by at least inverse orthogonal transform computation, said method comprising:
first, a subtraction step for subtracting said X1 from said X0 to generate new X0,
second, a first addition step for adding said X1 to said X1 to generate new X0, and
third, a second addition step for adding said new X0 to said new X1 to generate new X1, wherein
said new X1 issued as output value Y0, and said newer X0 is used as output value Y1.

The present inventory of claim 85 is a decoding method for subjecting coded data to inverse orthogonal transform and signal format conversion to obtain image data, at the time when output value Y0, i.e., X0+X1, and output value Y1, i e, X0−X1, are generated from two input values X0 and X1 by at least inverse orthogonal transform computation, said method comprising:
first, a first addition step for adding said X0 to said X1 to generate new X1,
second, a shifting step for shifting said X0 used as a binary number by one bit to the MSB side to generate new X0, and
third, a subtraction step for subtracting said new X1 from said new X0 to generate newer X0, wherein
said new X1 is used as output value Y0, and said newer X0 is used as output value Y1.

The present invention of claim 88 is a decoding method for subjecting coded data to inverse orthogonal transform and signal format conversion to obtain image data, at the time when output value Y0, i.e., X0+X1, and output value Y1, i.e., X0−X1, are generated from two input values X0 and X1 by at least inverse orthogonal transform computation, said method comprising:
first, a subtraction step for subtracting said X1 from said X0 to generate new X0,
second, a shifting step for shifting said X1 used as a binary number by one bit to the MSB side to generate new X1, and
third, a second addition step for adding said new X0 to said new X1 to generate new X1, wherein
said new X1 is used as output value Y0, and said newer X0 issued as output value Y1.

The present invention of claim 91 is a decoding method for subjecting coded data to inverse orthogonal transform and signal format conversion in block units to obtain image data, comprising:

an existence range detection step, wherein, when said coded information is decoded to orthogonal coefficient components, only the non-zero orthogonal coefficient components are detected, and by storing the positions of said orthogonal coefficient components inside blocks, the existence range of orthogonal coefficient components is detected in block units, and an inverse orthogonal transforming step wherein, when the coefficient components other than DC components are all set to 0 by said existence range detection step, the pixel values of said blocks are replaced with said DC components or multiples of said DC components, and when coefficient components other than said DC components are present, ordinary inverse orthogonal transform is carried out.

The present invention of claim 94 is a decoding method for subjecting coded data to inverse orthogonal transform and signal format conversion in block units to obtain image data, at the time when input pixels are divided into horizontal and vertical two-dimensional block units and transformed into orthogonal coefficient components by using orthogonal transform, and information obtained by coding said orthogonal coefficient components is decoded by using inverse orthogonal transform and the like, assuming that either the horizontal or the vertical direction is referred to as a first direction and the other is referred to as a second direction, and that said two-dimensional block has m×n coefficient components comprising coefficient components in said first direction and n coefficient components in said second direction, said method comprising:
an existence range detection step for detecting the existence range of non-zero orthogonal coefficient components in said first direction for said m coefficient component units when said coded information is decoded to orthogonal coefficient components, and
an inverse orthogonal transform selection step, wherein plural kinds of inverse orthogonal transform steps for transforming orthogonal coefficient components into pixel components are provided, and said inverse orthogonal transform steps are selected depending on said range detected by said existence range detection step.

The present invention of claim 97 is a decoding method for subjecting coded data to inverse orthogonal transform and signal format conversion in block units to obtain image data, at the time when input pixels are divided into horizontal and vertical two-dimensional block units and transformed into orthogonal coefficient components by using orthogonal transform, and information obtained by coding said orthogonal coefficient components is decoded by using inverse orthogonal transform or the like; assuming that either the horizontal or the vertical direction is referred to as a first direction and the other is referred to as a second direction, and that said two-dimensional block has m×n coefficient components comprising m coefficient components in said first direction and n coefficient components in said second direction, provided with a single or plural kinds of inverse orthogonal transform steps in said first direction and said second direction for transforming orthogonal coefficient components into pixel components, said method comprising:
a first-direction existence range detection step for detecting the existence range of non-zero orthogonal coefficient components in said first direction for said m coefficient component units when said coded information is decoded to orthogonal coefficient components,
a first-direction inverse orthogonal transform selection step for selecting said first-direction inverse orthogonal transform steps depending on said range detected by said first-direction existence range detection step,
a second-direction existence range detection step for detecting the existence range of non-zero orthogonal coefficient components in said second direction for n coefficient component units after said first-direction inverse orthogonal transform, and
a second-direction inverse orthogonal transform selection step for selecting said second-direction inverse orthogonal transform steps depending on said range detected by said second-direction existence range detection step.

The present invention of claim 103 is a decoding method in accordance with claim 97, wherein, when said existence range detection is carried out, in the case when orthogonal coefficient components are rearranged by using zigzag scanning during coding, an existence range to be stored in each orthogonal transform unit in said first direction is set to the position of the last non-zero orthogonal coefficient component.

The present invention of claim 109 is a decoding method for subjecting coded data to inverse orthogonal transform and signal format conversion to obtain image data, comprising:

a decoding step for decoding coded data in a predetermined signal format,
an inverse orthogonal transform step for subjecting said decoded data to inverse orthogonal transform, and
a signal format conversion step for converting said image detain said predetermined signal format subjected to said inverse orthogonal transform into image data in another signal format, wherein
said decoding step, said inverse orthogonal transform step and said signal format conversion step are carried out continuously for data in a predetermined range.

The present invention of claim 112 is a decoding method in accordance with claim 109, wherein said image data in said predetermined signal format comprises luminance, first color difference and second color difference signals, and image data after signal format conversion comprises red, green and blue signals.

The present invention of claim 115 is a decoding method in accordance with claim 109, wherein said image data in said predetermined signal format comprises luminance, first color difference and second color difference signals, and image data after signal format conversion comprises luminance, first color difference and second color difference signals having a configuration different from that before conversion.

BRIEF DESCRIPTION OF THE DRAWINGS

FIG. 14 is a view illustrating a method of gaining access to a second table in accordance with the 11th embodiment of the present invention;

FIG. 26 is a block diagram illustrating the configuration of a YUV format signal;

FIG. 29 is a view illustrating variable-length codes for DVC;

FIG. 37(*b*) is a view illustrating a case accommodating the floppy disk; and

FIG. 37(*c*) is a view wherein programs are recorded to and reproduced from the floppy disk.

BEST MODE FOR CARRYING OUT THE INVENTION

Figure 1:
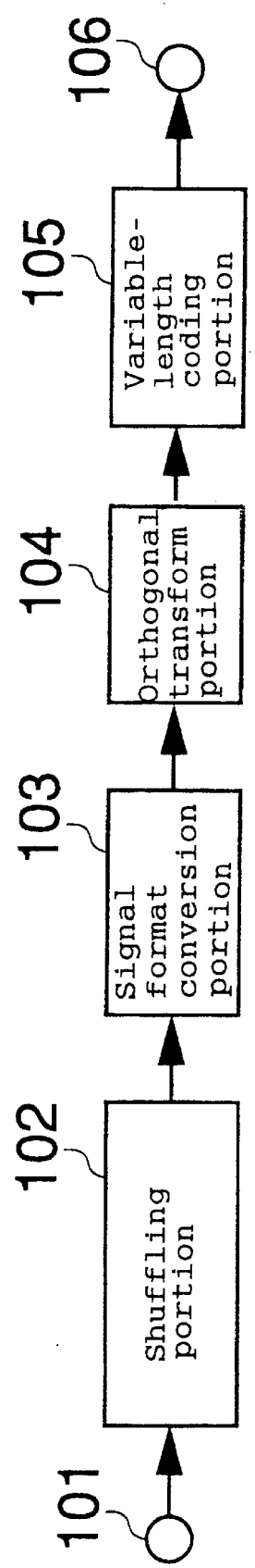
FIG. 1 is a block diagram illustrating a first embodiment of the present invention.

Embodiments in accordance with the present invention will be described below referring to the drawings.

A first embodiment, an embodiment of a first invention will be described referring to FIGS. 1 and 2.

FIG. 1 is a block diagram illustrating the configuration of a coding apparatus in accordance with the first embodiment. In FIG. 1, the numeral 101 represents an input terminal, the numeral 102 represents a shuffling portion used as a rearranging means, the numeral 103 represents a signal format conversion portion, the numeral 104 represents an orthogonal transform portion, the numeral 105 represents a variable-length coding portion, and the numeral 106 represents an output terminal. It is assumed that the image signal to be input from the input terminal 101 is an RGB format signal.

The RGB format signal having been input from the input terminal 101 is subjected to shuffling by the shuffling portion 102. The shuffled RGB format signal is sent to the signal format conversion portion 103, and converted into a YUV format signal. The YUV format signal is subjected to orthogonal transform by the orthogonal transform portion 104, and an orthogonal transform coefficient is obtained. The orthogonal transform coefficient is Huffman-coded by the variable-length coding portion 105. At this time, the above-mentioned orthogonal transform coefficient is quantized appropriately so that the amount of codes in all sync blocks does not exceed a certain value. The coded image signal is output from the output terminal 106.

Figure 2:
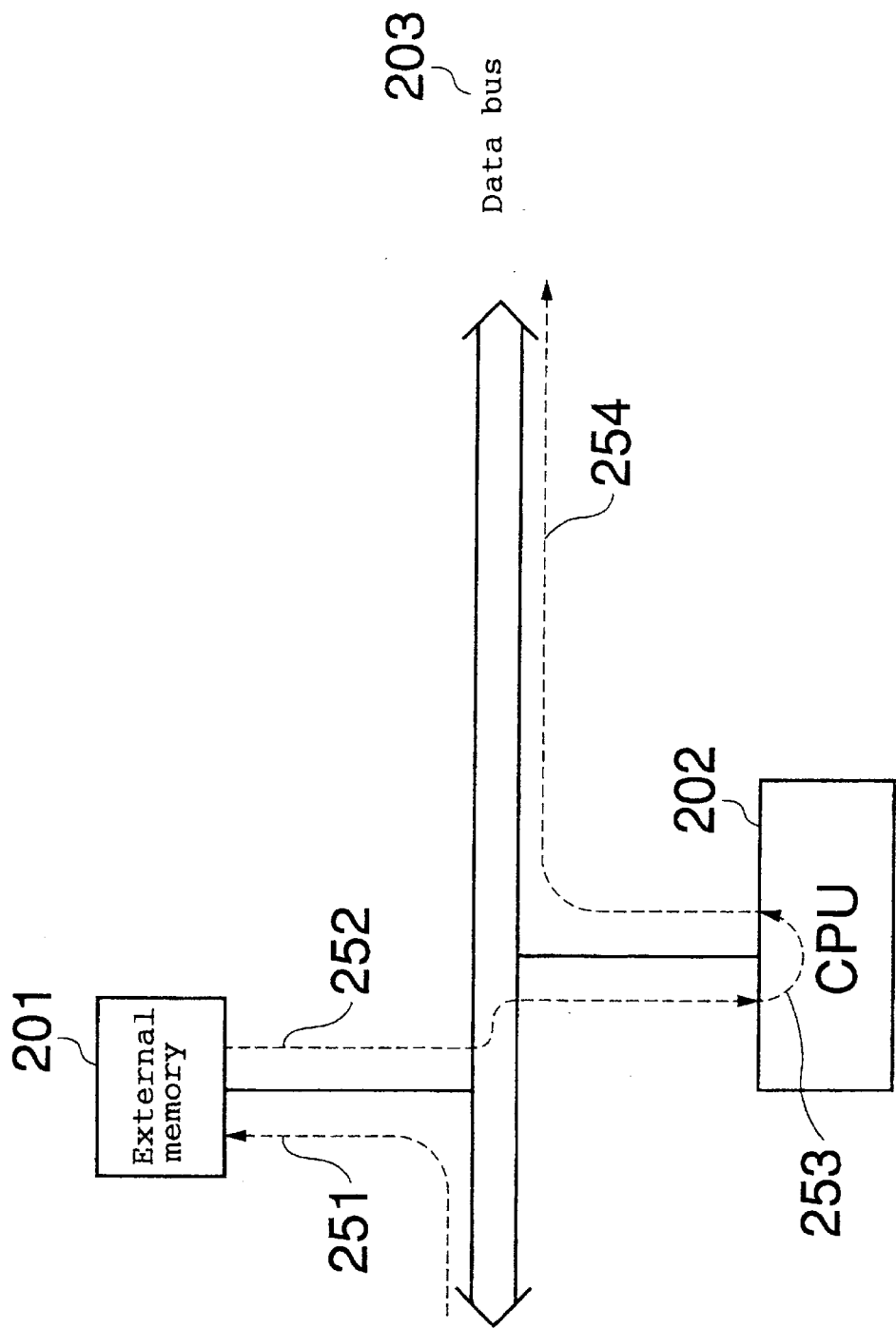
FIG. 2 is a schematic view illustrating the flow of data at the time when the first embodiment of the present invention is accomplished by using a computer.

FIG. 2 is a view illustrating the flow of data at the time when the processing of the present embodiment is carried out by using a computer. In FIG. 2, the numeral 201 represents an external memory, the numeral 202 represents a CPU, and the numeral 203 represents a data bus.

Just as in the case of the conventional example, the input RGB format signal is mapped in an area of the external memory 201 (corresponding to the dotted line indicated by the numeral 251 in FIG. 2). For the RGB format signal mapped in the external memory 201, pixel data stored in the address according to a shuffling pattern is transferred to the CPU 202 (the numeral 252). At the CPU 202, signal format conversion, orthogonal transform and variable-length coding are carried out in sequence (the numeral 253). A series of these computations can be carried out in sync blocks, i.e., in 30 block units. When it is assumed that the amount of information for one pixel is 1 byte, 30×8×8=1920 bytes are required, and this can be held in the cache memory located inside the CPU. Data transfer time between the register for computation and the cache memory is sufficiently shorter than that between the register and the external memory 201. Therefore, signal format conversion and orthogonal transform can be carried out continuously without using the external memory. The coded image signal is output via the data bus 203 (the numeral 254).

Figure 35:
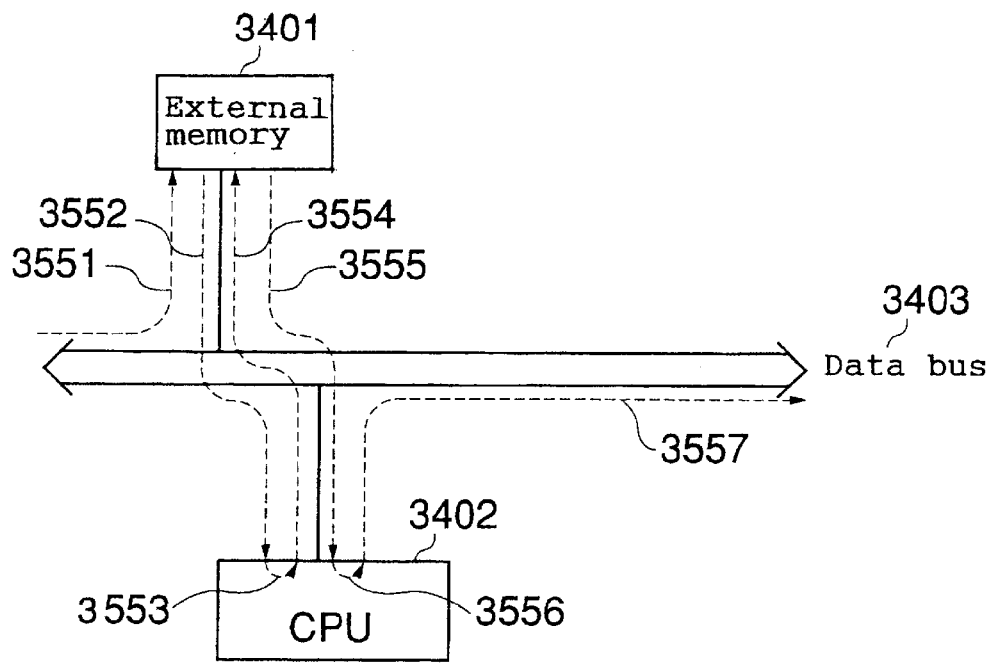
FIG. 35 is a schematic view illustrating the flow of data at the time when conventional coding is accomplished by using a computer.

As described above, in comparison with the conventional example shown in FIG. 35, in the first embodiment, operation for writing data back once to the memory in order to carry out reshuffling and operation for reading data again from the memory in order to carry out orthogonal transform and variable-length coding can be omitted, after signal format conversion. As a result, data transfer between the CPU and the external memory is not necessary, whereby processing time can be shortened significantly.

An RGB format signal is used as an input image signal in the present embodiment; however, even when the input signal is a YUV 422 component signal, and the YUV 422 component signal is converted into a YUV 411 component signal by the signal conversion portion, the same effect can be obtained.

A recording medium, such as a magnetic recording medium or an optical recording medium, wherein coded programs for executing the functions of all or parts of the means in accordance with the present embodiment by using a computer are recorded, may be created and the same operation as that described above may be carried out by using such a medium.

The above-mentioned embodiment mainly corresponds to claims 1, 2 and 3 of the present invention.

Figure 3:
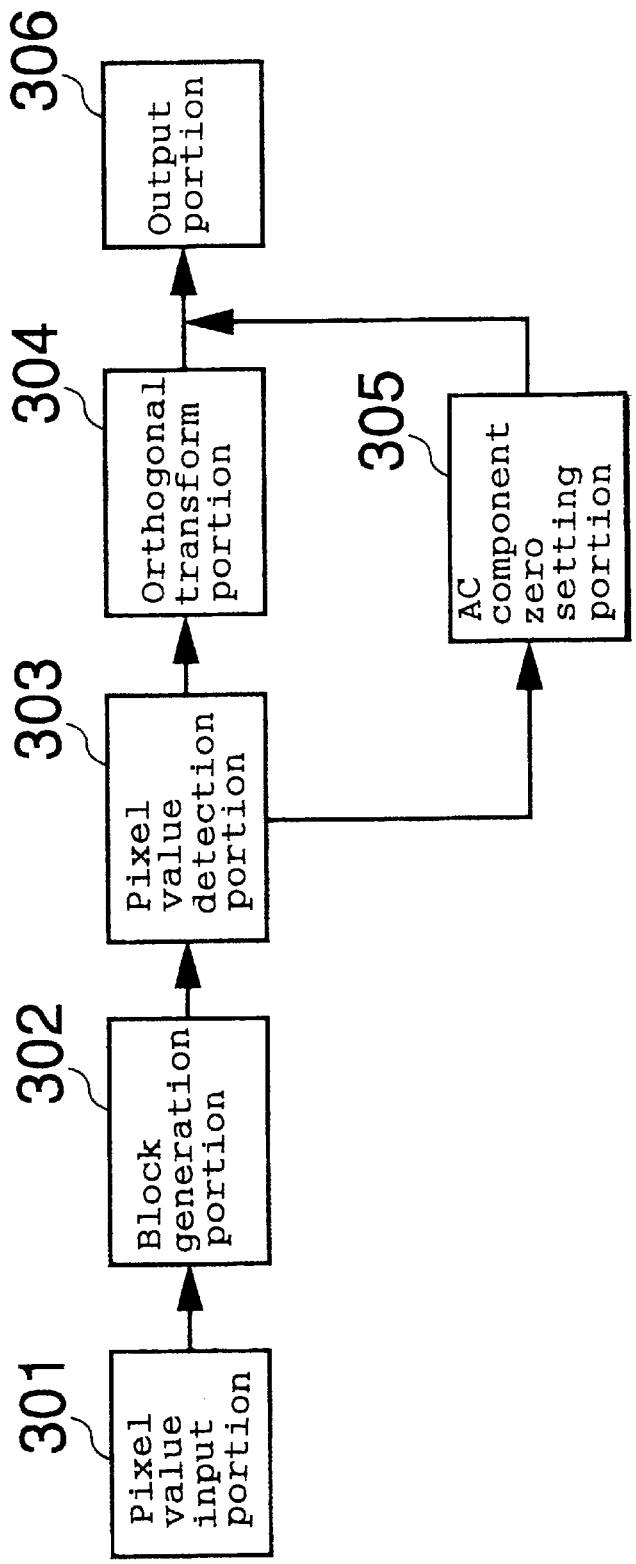
FIG. 3 is a block diagram illustrating a second embodiment of the present invention.

A second embodiment, an embodiment of a second invention, will be described referring to FIG. 3. FIG. 3 is a block diagram illustrating the configuration of a coding apparatus in accordance with the second embodiment. The numeral 301 shown in FIG. 3 is a pixel value input portion, the numeral 302 represents a block generation portion, the numeral 303 represents a pixel value detection portion, the numeral 304 represents an orthogonal transform portion, the numeral 305 represents an AC component zero setting portion, and the numeral 306 represents an output portion.

Next, while the operation of the second embodiment is described below, the operation of an embodiment of a coding method in accordance with the present invention will also be described simultaneously.

In the present embodiment, video data in pixel units having been input from the pixel value input portion 301 is first divided into a two-dimensional block comprising horizontal 8 pixels and vertical 8 pixels by the block generation portion 302. Next, the pixel value detection portion 303 carries out detection to judge whether all the pixel values in each block are nearly identical or not. In the case when the pixel values in a block are nearly identical as the result, a given pixel value in the block or its multiple is set as a DC coefficient component by the AC component zero setting portion 305, and all the other AC coefficient component values are set to 0, and the output is carried out by the output portion 306. Conversely, in the case when the pixel values in the block are not nearly identical, the orthogonal transform portion 304 carries out ordinary two-dimensional orthogonal transform, and output is carried out by the output portion 306.

When the pixel values in the block are nearly identical, orthogonal transform computation can be omitted in the second embodiment as described above, whereby the amount of computation required for orthogonal transform can be decreased significantly. Furthermore, at the AC component zero setting portion 305, it is possible to use the computation result obtained from plural pixel values in the block as a DC coefficient component value. Moreover, usually, discrete cosine transform (DCT) is applied as orthogonal transform.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 10 to 12 of the present invention.

A third embodiment, an embodiment of a third invention, will be described referring to FIG. 4.

Figure 4:
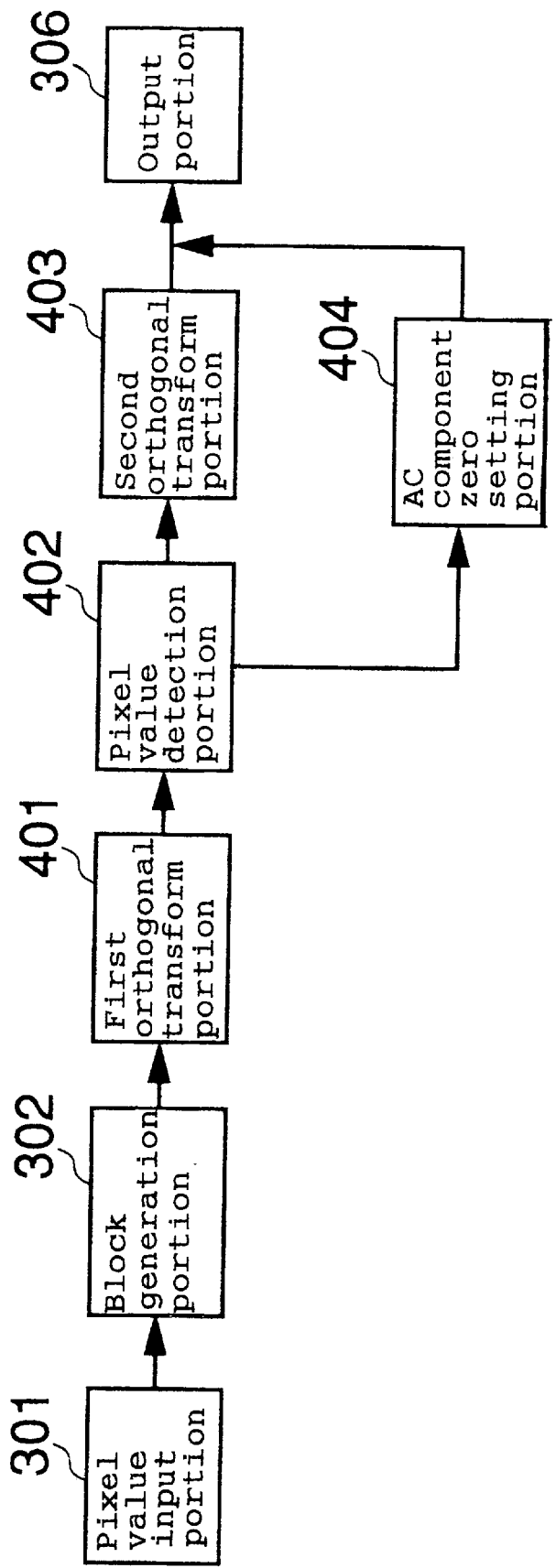
FIG. 4 is a block diagram illustrating a third embodiment of the present invention.

FIG. 4 is a block diagram illustrating the configuration of a coding apparatus in accordance with the third embodiment. The numeral 401 represents a first orthogonal transform portion, the numeral 402 represents an image value detection portion, the numeral 403 represents a second orthogonal transform portion, and the numeral 404 represents an AC component zero setting portion.

The operations of the pixel value input portion 301 and the block generation portion 302 shown in FIG. 4 are the same as those described referring to FIG. 3.

Pixel values in blocks are first subjected to orthogonal transform in the horizontal direction by the first orthogonal transform portion 401. Next, the pixel value detection portion 402 checks the pixel values (coefficient components), subjected to orthogonal transform in the horizontal direction, in the vertical direction and carries out detection as to whether all the coefficient component values in an orthogonal transform unit in the vertical direction are nearly identical or not.

In the case when the coefficient component values in the orthogonal transform unit in the vertical direction are nearly identical, a given coefficient component value in the above-mentioned orthogonal transform unit in the Vertical direction or its multiple is set to a DC coefficient component by the AC component zero setting portion 404, and all the other AC coefficient component values are set to 0, and then output is carried out by the output portion 306. Conversely, in the case when the above-mentioned coefficient component values in the orthogonal transform unit in the vertical direction are not nearly identical, the second orthogonal transform portion 403 carries out ordinary orthogonal transform, and output is carried out by the output portion 306.

In the present embodiment, selection is made to determine whether orthogonal transform computation is carried out or not at the time of orthogonal transform to be carried out at the second time of two-dimensional orthogonal transform in the horizontal or vertical direction. Since information usually concentrates on some parts of coefficient components by the first orthogonal transform, orthogonal transform units having only DC components are present in large quantity at the time of the second orthogonal transform. Therefore, the number of times actual orthogonal transform computations are carried out can be decreased significantly.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 13 to 15 of the present invention.

A fourth embodiment, an embodiment of a fourth invention, will be described referring to FIG. 5.

Figure 5:
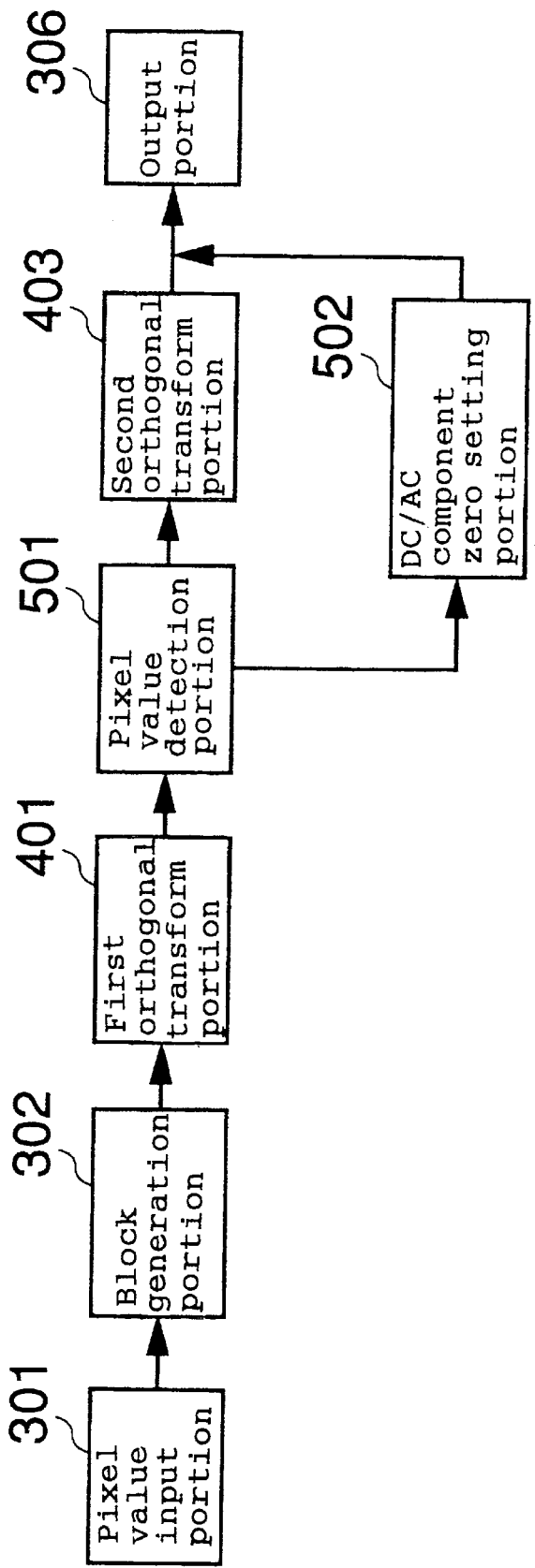
FIG. 5 is a block diagram illustrating a fourth embodiment of the present invention.

FIG. 5 is a block diagram illustrating the configuration of a coding apparatus in accordance with the fourth embodiment. In FIG. 5, the numeral 501 represents a pixel value detection portion, the numeral 502 represents a DC/AC component zero setting portion.

The operations of the pixel value input portion 301, the block generation portion 302 and the first orthogonal transform portion 401 shown in FIG. 5 are the same as those shown in FIG. 4.

The pixel value detection portion 501 checks the pixel values (coefficient components), subjected to orthogonal transform in the horizontal direction, in the vertical direction, and carries out detection as to whether all the coefficient component values in the orthogonal transform unit in the vertical direction are nearly zero or not.

In the case when the coefficient component values in the orthogonal transform unit in the vertical direction are nearly zero, the above-mentioned DC coefficient component values in the orthogonal transform unit in the vertical direction and all the AC coefficient component values are set to zero by the DC/AC component zero setting portion 502, and output is carried out by the output portion 306. Conversely, in the case when the above-mentioned coefficient component values in the orthogonal transform unit in the vertical direction are not nearly zero, the second orthogonal transform portion 403 carries out ordinary orthogonal transform, and output is carried out by the output portion 306.

Also in the present embodiment, selection is made to determine whether orthogonal transform computation is carried out or not at the time of orthogonal transform to be carried out at the second time of two-dimensional orthogonal transform in the horizontal or vertical direction. Orthogonal transform units wherein all the coefficient components are zero are present in large quantity usually at the second time of orthogonal transform. Therefore, the number of times actual orthogonal transform computations are carried out can be decreased significantly.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 16 to 18 of the present invention.

In the second, third and fourth embodiments, when applied to a computation apparatus capable of simultaneously computing k pixels or k orthogonal coefficients, efficiency can be improved further by making a change so that the detection or the like in the above-mentioned embodiments is carried out in k pixel units.

Furthermore, the present invention is applicable to any given image signals, and any given methods other than those of the embodiments with respect to the number of dimensions and type of orthogonal transform are also applicable. In addition, it is possible to change the sequence of the horizontal and vertical computation for the two-dimensional orthogonal transform.

Moreover, the configurations of the embodiments illustrated by the block diagrams and their processing sequences can also be accomplished by various methods.

A fifth embodiment, an embodiment of a fifth invention, will be described referring to FIG. 6.

Figure 6:
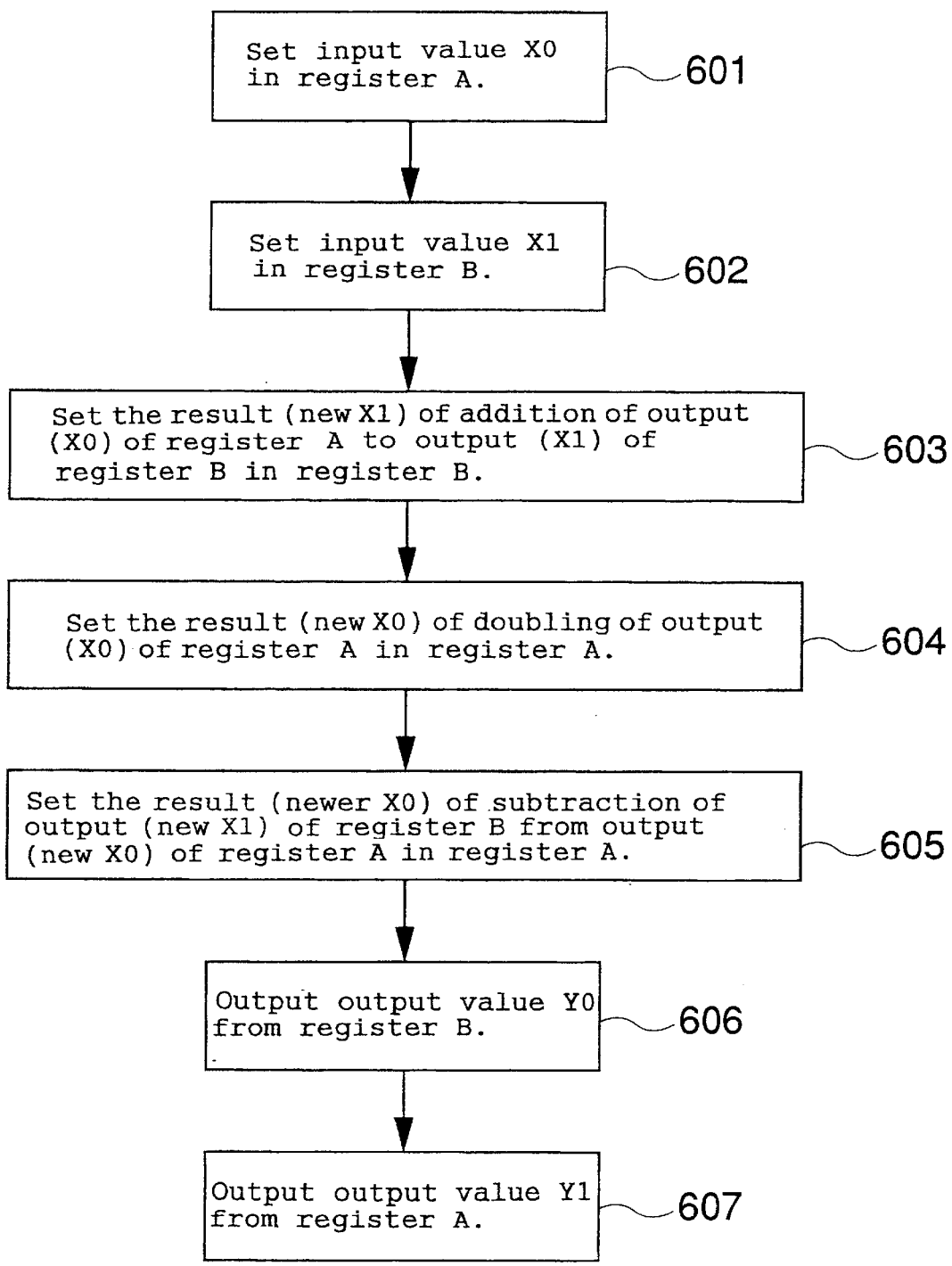
FIG. 6 is a flowchart illustrating a fifth embodiment of the present invention.

FIG. 6 is a flowchart illustrating an addition/subtraction method in accordance with the fifth embodiment. The numeral 601 shown in FIG. 6 represents a first input step, the numeral 602 represents a second input step, the numeral 603 represents a first computation step, the numeral 604 represents a second computation step, the numeral 605 represents a third computation step, the numeral 606 represents a first output step, and the numeral 607 represents a second output step.

Next, the operation of the present embodiment will be described.

First, at the first input step 601, input value X0 is set in register A, and at the second input step 602, input value X1 is set in register B. At the first computation step 603, the output (input value X0) of register A is added to the output (input X1) of register B, and the result (new X1) is set in register B. At the second computation step 604, the output (input value X0) of register. A is doubled, and the result (new X0) is set in register A. At the third computation step 605, the output (new X1) of register B is subtracted from the output (new X0) of register A, and the result (newer X0) is set in register A. Finally, at the first output step 606, the output of register B is output as output value Y0, and at the second output step 607, the output of register A is output as output value Y1.

As described above, in the present embodiment, only the two registers, registers A and B, are used to accomplish butterfly computation. For this reason, four sets of butterfly computations required for eight-dimensional orthogonal transform can be accomplished by using only eight registers. In this case, by using the newest MMX-compatible registers, orthogonal transform can be accomplished without saving on memory. In addition, since the above-mentioned addition and subtraction computations are repeated for orthogonal transform, the output in the embodiment of the present invention may become the input for the next addition and subtraction computations.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium The above-mentioned embodiment mainly corresponds to claims 22 to 24 and 73 to 75 of the present invention.

Figure 7:
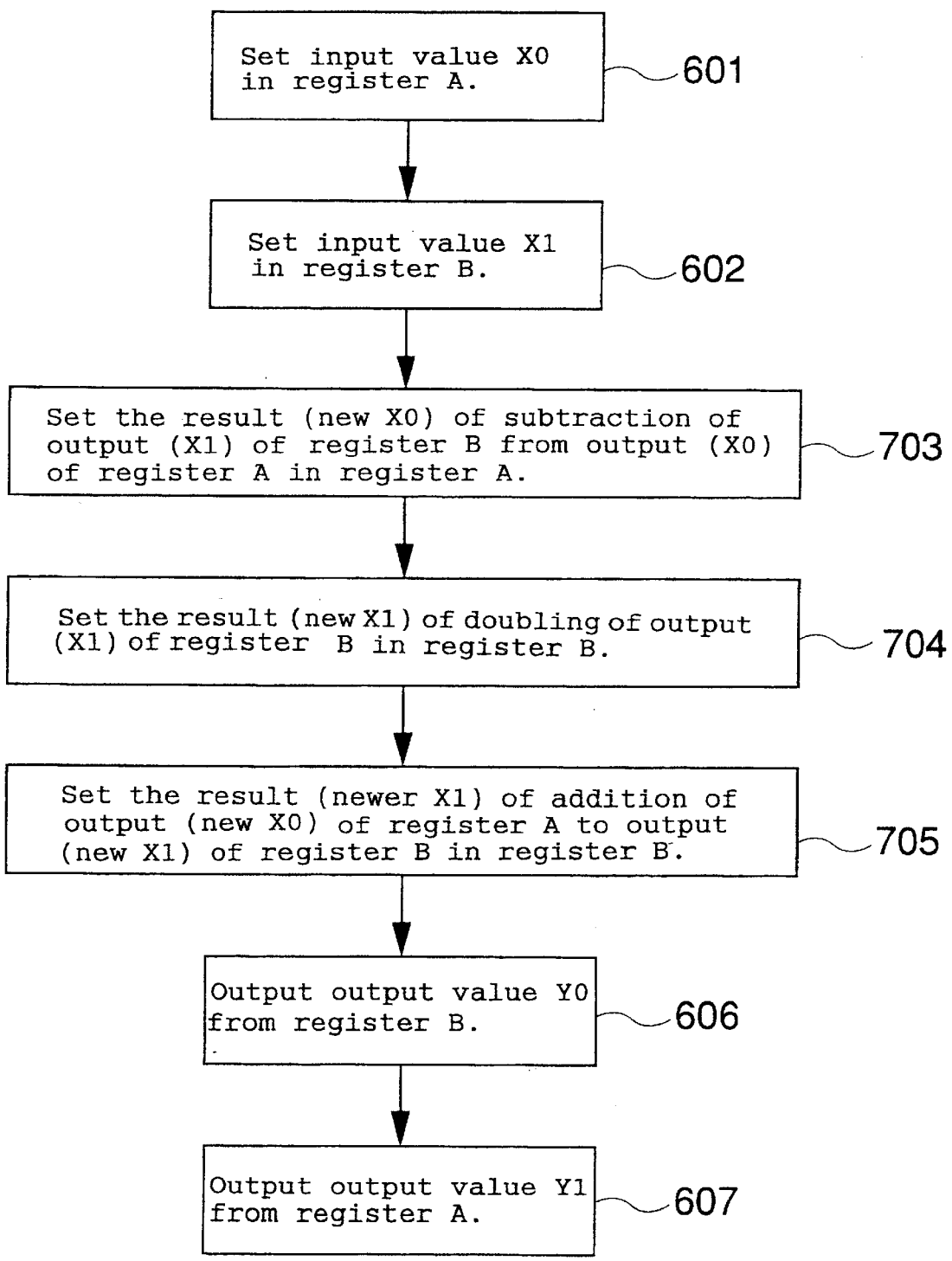
FIG. 7 is a flowchart illustrating a sixth embodiment of the present invention.

A sixth embodiment, an embodiment of a sixth invention, will be described referring to FIG. 7. FIG. 7 is a flowchart illustrating an addition/subtraction method in accordance with the sixth embodiment. Although the configuration shown in FIG. 7 is almost the same as that shown in FIG. 6, the numeral 703 in the figure represents a first computation step, the numeral 704 represents a second computation step, and the numeral 705 represents a third computation step.

In the present embodiment, first, at the first input step 601, input value X0 is set in register A, and at the second input step 602, input value, X1 is set in register B. At the first computation step 703, the output (input value X1) of register B is subtracted from the output (input value X0) of register A, and the result (new X0) is set in register A. At the second computation step 704, the output (input value X1) of register B is doubled, and the result (new X1) is set in register B. At the third computation step 705, the output (new X0) of register A is added to the output (new X1) of register B, and the result (newer X1) is set in register B. Finally, at the first output step 606, the output of register B is output as output value Y0, and at the second output step 607, the output of register A is output as output value Y1.

Just as in the case of the fifth embodiment, in the present embodiment, butterfly computation can also be accomplished by using only the two registers.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 25 to 27 and 76 to 78 of the present invention.

Figure 8:
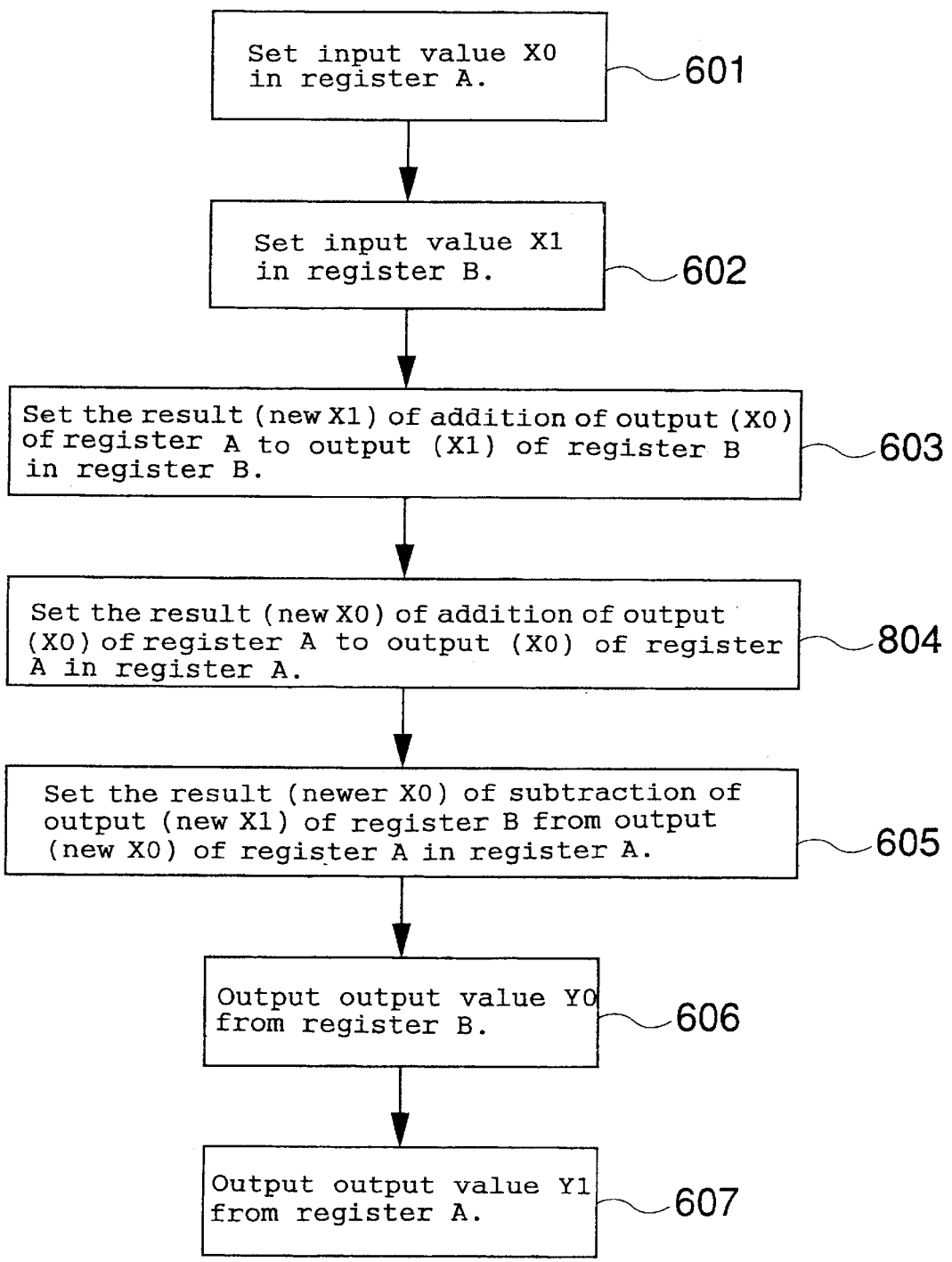
FIG. 8 is a flowchart illustrating a seventh embodiment of the present invention.

A seventh embodiment, an embodiment of a seventh invention, will be described referring to FIG. 8. FIG. 8 is a flowchart illustrating an addition/subtraction method in accordance with the seventh embodiment. In the present embodiment, the second computation step 604 of the fifth embodiment is changed to a second computation step 804. First, at the first input step 601, input value X0 is set in register A, and at the second input step 602, input value X1 is set in register B. At the first computation step 603, the output (input value X0) of register A is added to the output (input X1) of register B, and the result (new X1) is set in register B. At the second computation step 704, the output (input value X0) of register A is added to the output (input value X0) of register A, and the result (new X0) is set in register A. At the third computation step 605, the output (new X1) of register B is subtracted from the output (new X0) of register A, and the result (newer X0) is set in register A. Finally, at the first output step 606, the output of register B is output as output value Y0, and at the second output step 607, the output of register A is output as output value Y1.

As described above, in the present embodiment, the double computation of the fifth embodiment is accomplished by addition computation. Since the addition computation is a basic function of a computer and can be accomplished at high speed, the butterfly computation can be accomplished at high speed. In addition, in the case of a CPU capable of executing two instructions simultaneously, it is highly likely that an addition instruction can be executed simultaneously with another instruction, whereby it is possible to further improve computation efficiency.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 28 to 30 and 79 to 81 of the present invention.

An eighth embodiment, an embodiment of an eighth invention, will be described referring to FIG. 9.

Figure 9:
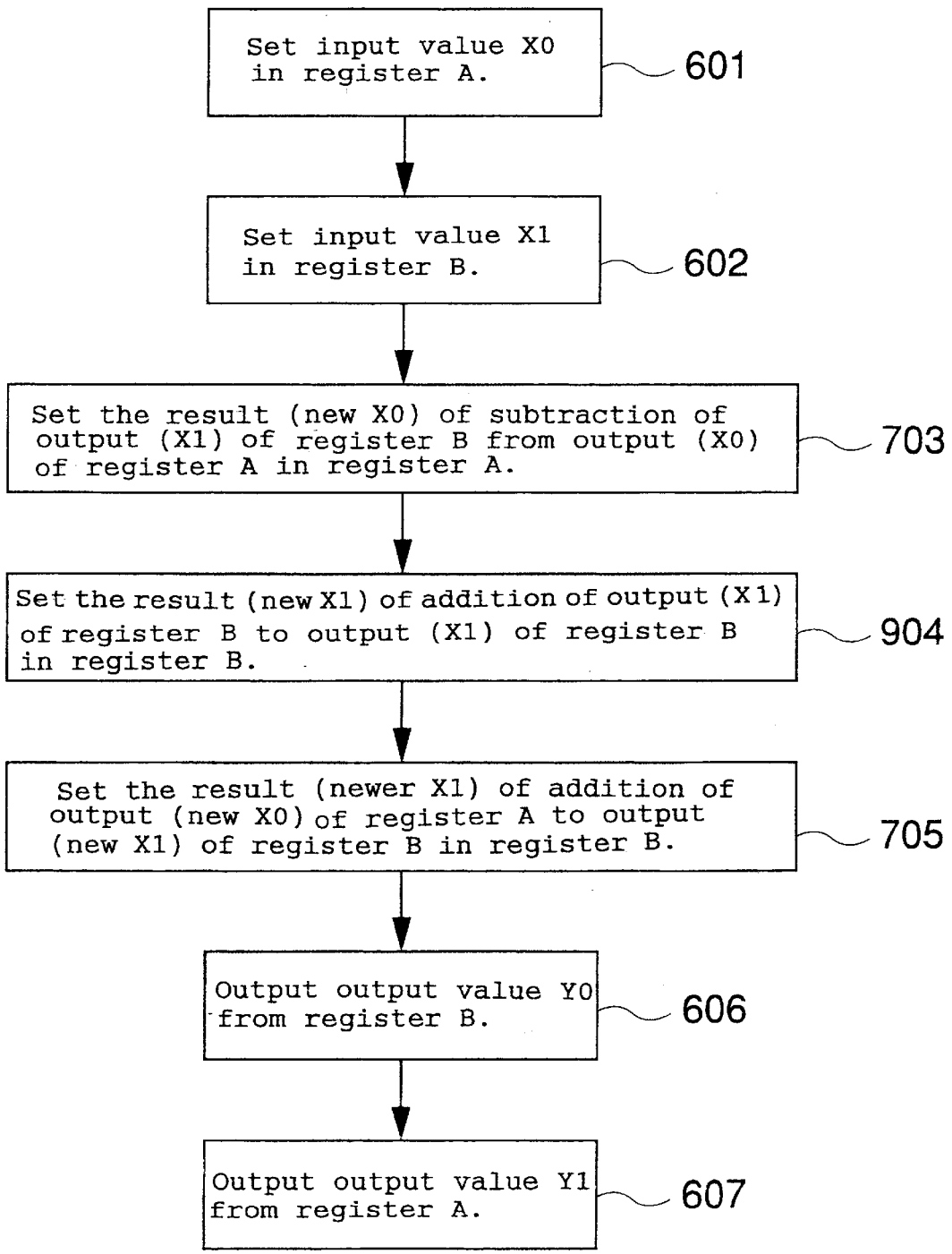
FIG. 9 is a flowchart illustrating an eighth embodiment of the present invention.

FIG. 9 is a flowchart illustrating an addition/subtraction method in accordance with the eighth embodiment. In the present embodiment, the second computation, step 704 of the sixth embodiment is changed to a second computation step 904. First, at the first input step 601, input value X0 is set in register A, and at the second input step 602, input value X1 is set in register B. At the first computation step 703, the output (input value X1) of register B is subtracted from the output (input X0) of register A, and the result (new X0) is set in register A. At the second computation step 904, the output (input value X1) of register B is added to the output (input value X1) of register B, and the result (new X1) is set in register B. At the third computation step 705, the output (new X0) of register A is added to the output (new X1) of register B, and the result (newer X1) is set in register B. Finally, at the first output step 606, the output of register B is output as output value Y0, and at the second output step 607, the output of register A is output as output value Y1.

In the present embodiment, the double computation of the fifth embodiment is also accomplished by high-speed addition computation.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 31 to 33 and 82 to 84 of the present invention.

A ninth embodiment, an embodiment of a ninth invention, will be described referring to FIG. 10.

Figure 10:
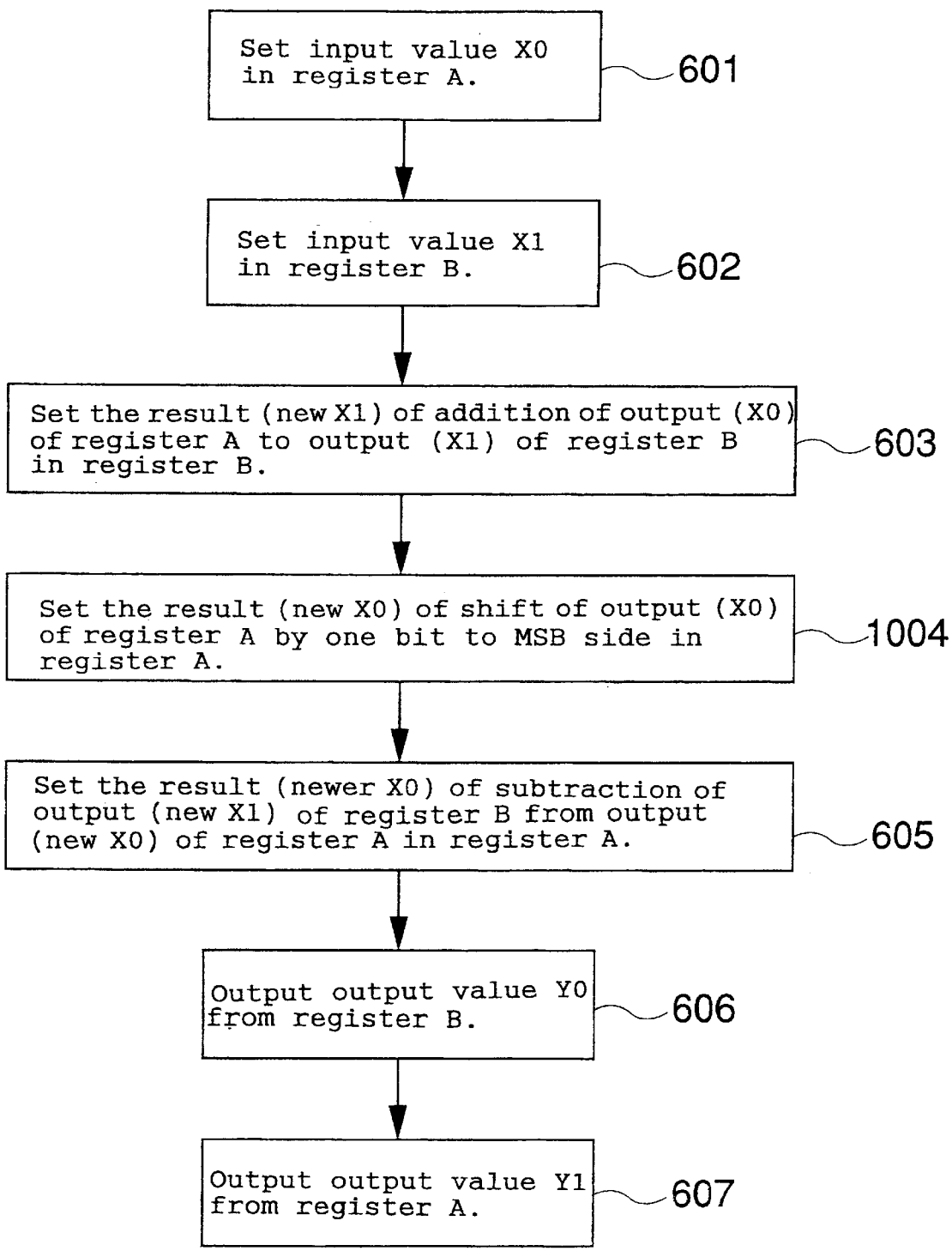
FIG. 10 is a flowchart illustrating a ninth embodiment of the present invention.

FIG. 10 is a flowchart illustrating an addition/subtraction method in accordance with the ninth embodiment. In the present embodiment, the second computation step 604 of the fifth embodiment is changed to a second computation step 1004. First, at the first input step 601, input value X0 is set in registers A, and at the second input step 602, input value X1 is set in register B. At the first computation step 603, the output (input value X0) of register A is added to the output. (input X1) of register B, and the result (new X1) is set in register B. At the second computation step 1004, the output (input value X0) of register A is shifted by 1 bit to the MSB side, and the result (new X0) is set in register A. At the third computation step 605, the output (new X1) of register B is subtracted from the output (new X0) of register A, and the result (newer X0) is set in register A. Finally, at the first output step 606, the output of register B is output as output value Y0, and at the second output step 607, the output of register A is output as output value Y1.

As described above, in the present embodiment, the double computation of the fifth embodiment is accomplished by simple shift computation. Since the shift computation is a basic function of a computer and can be accomplished at high speed, the butterfly computation can be accomplished at high speed.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 34 to 36 and 85 to 87 of the present invention.

A tenth embodiment, an embodiment of a tenth invention, will be described referring to FIG. 11.

Figure 11:
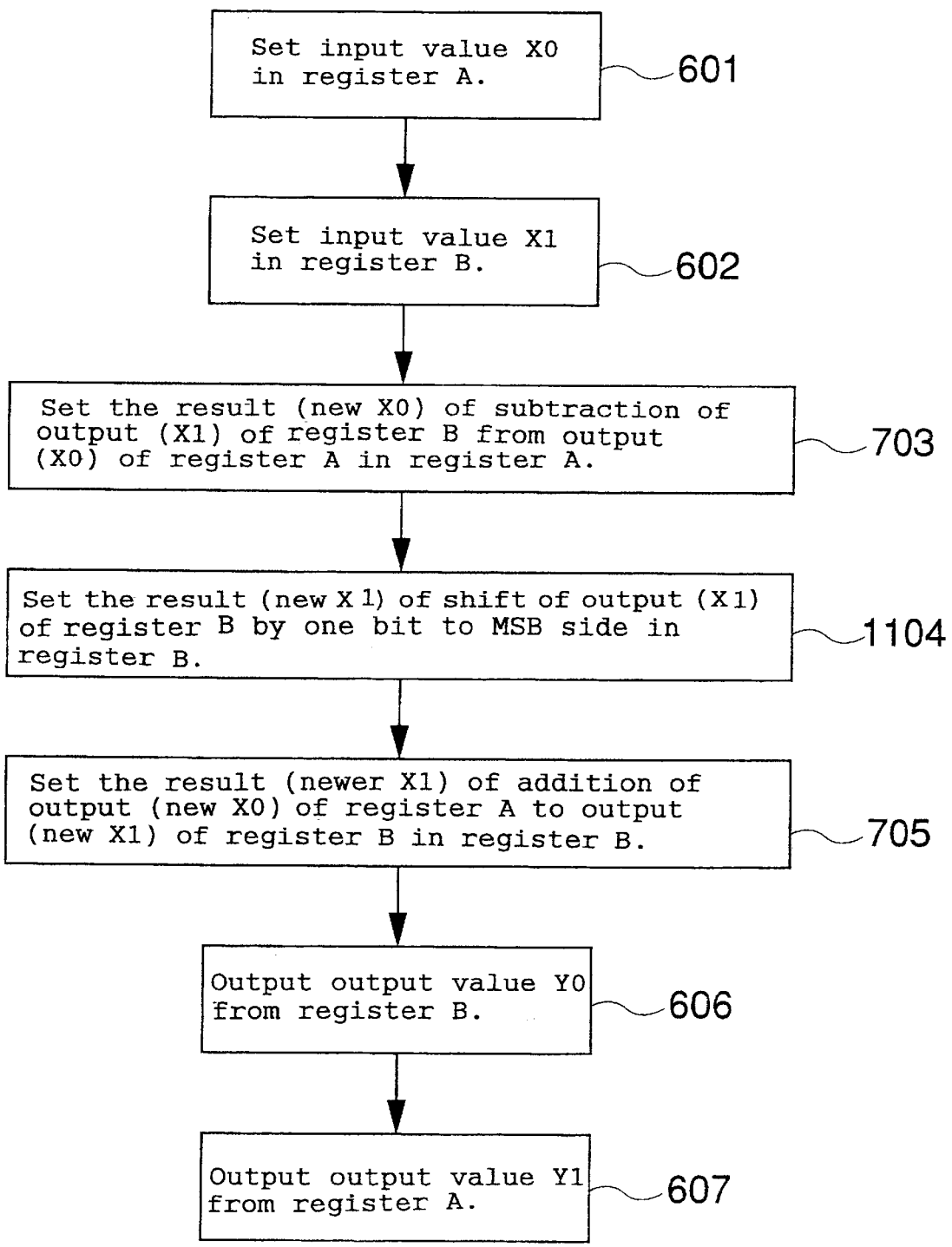
FIG. 11 is a flowchart illustrating a 10th embodiment of the present invention.

FIG. 11 is a flowchart illustrating an addition/subtraction method in accordance with the tenth, embodiment. In the present embodiment, the second computation step 704 of the sixth embodiment is changed to a second computation step 1104. First, at the first input step 601, input value X0 is set in register A, and at the second input step 602, input value X1 is set in register B. At the first computation step 703, the output (input value X1) of register B is subtracted from the output (input X0) of register A, and the result (new X0) is set in register A. At the second computation step 1104, the output (input value X1) of register B is shifted by one bit to the MSB side, and the result (new X1) is set in register B. At the third computation step 705, the output (new X0) of register A is added to the output (new X1) of registers B, and the result (newer X1) is set in register B. Finally, at the first output step 606, the output of register B is output as output value Y0, and at the second output step 607, the output of register A is output as output value Y1.

In the present embodiment, the double computation of the fifth embodiment is also accomplished by high-speed shift computation.

As described above, in the fifth to tenth embodiments of the present invention butterfly computation, i.e., basic computation for orthogonal transform, can be accomplished by using only the two registers, and saving the result of computation on memory can be minimized, whereby computation time can be shortened significantly.

The method of using the double computation (including addition computation and shift computation) in accordance with the present invention can be accomplished by various methods other than the above-mentioned embodiments; in addition to accomplishment by using only software, accomplishment by using hardware is possible. Furthermore, in actual orthogonal transform computation, in addition to the basic technology of the present invention, various computations corresponding to orthogonal transform to be carried out are added.

The orthogonal transform methods described in the fifth to tenth embodiments can be applied to not only orthogonal transform for coding but also inverse orthogonal transform for decoding in the completely same way.

A recording medium, such as, a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 37 to 39 and 88 to 90 of the present invention.

An 11th embodiment, an embodiment of an 11th invention, will be described referring to FIGS. 12 to 14.

Figure 29:
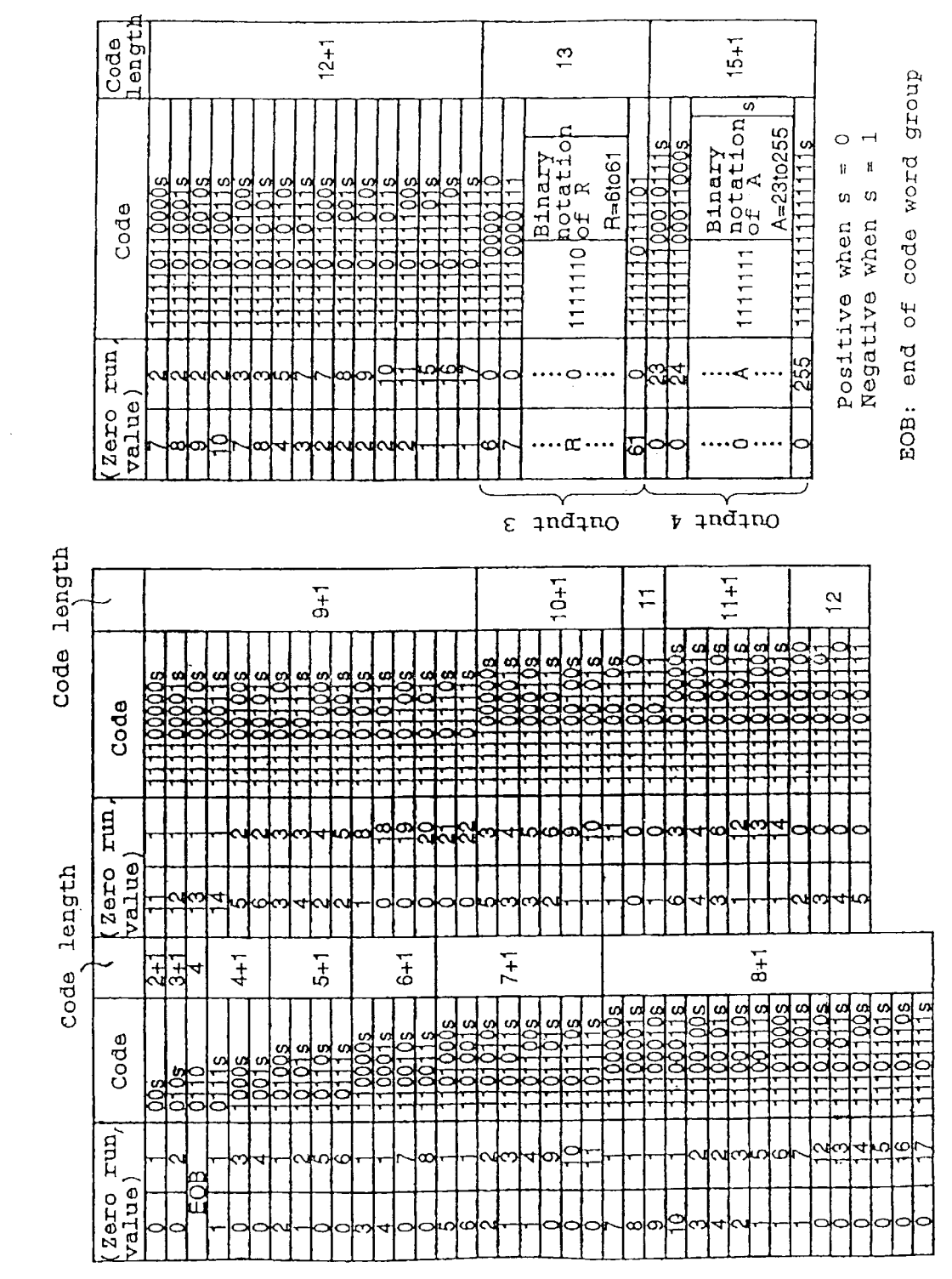

The variable-length code in the following embodiments in accordance with the present invention is a code wherein the maximum value of the code length of one code word, such as that shown in FIG. 29, is 16, and the code length s is determined uniquely by 8 bits from the head of a code word.

Figure 12:
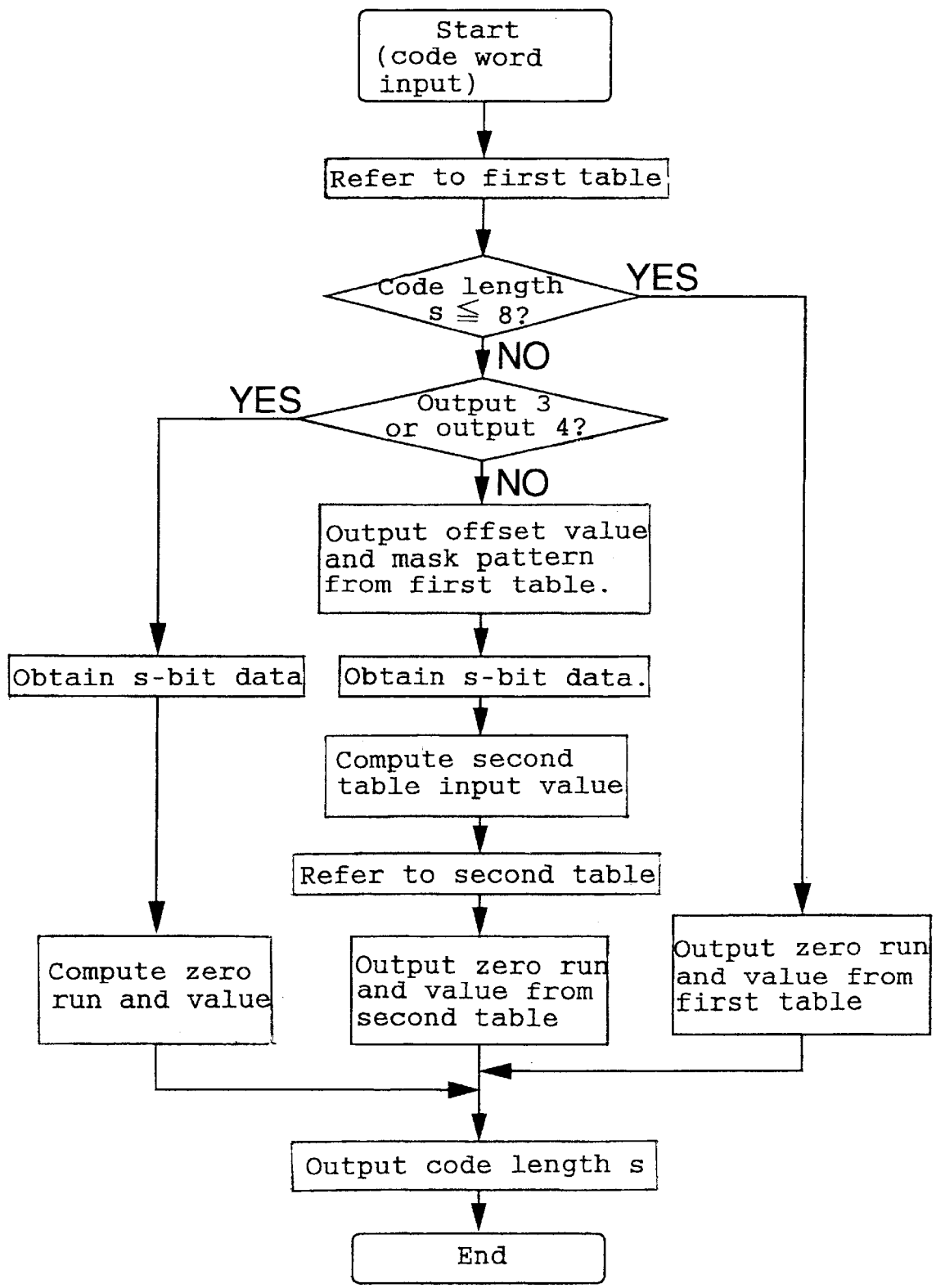
FIG. 12 is a flowchart illustrating an 11th embodiment of the present invention.

FIG. 12 is a flowchart illustrating a variable-length decoding method in accordance with the present embodiment.

When a code word is input, access to a first table is carried out by using the 8-bit data from the head as first table access data. In the first table, the code length s of the input 8-bit data is determined uniquely. When s≦8, zero run and value used as code length and data to be decoded are output When a code word is EOB, 127 for example, is set in the zero run so that it is identified as EOB.

When a code word is, "01111100110011" for example, the eight bits from the head of the code word, i.e., "01111100," is obtained. When this is input to the first table, s=5, zero run=1 and value−1 are obtained. At the same time, the code word is "01111," whereby decoding of the code word is completed. Furthermore, when s≧9 a mask pattern and an offset value for gaining access to a second table, in addition to the code length s, are output. The mask pattern and the offset value are unique with respect to the value of s.

Figure 13:
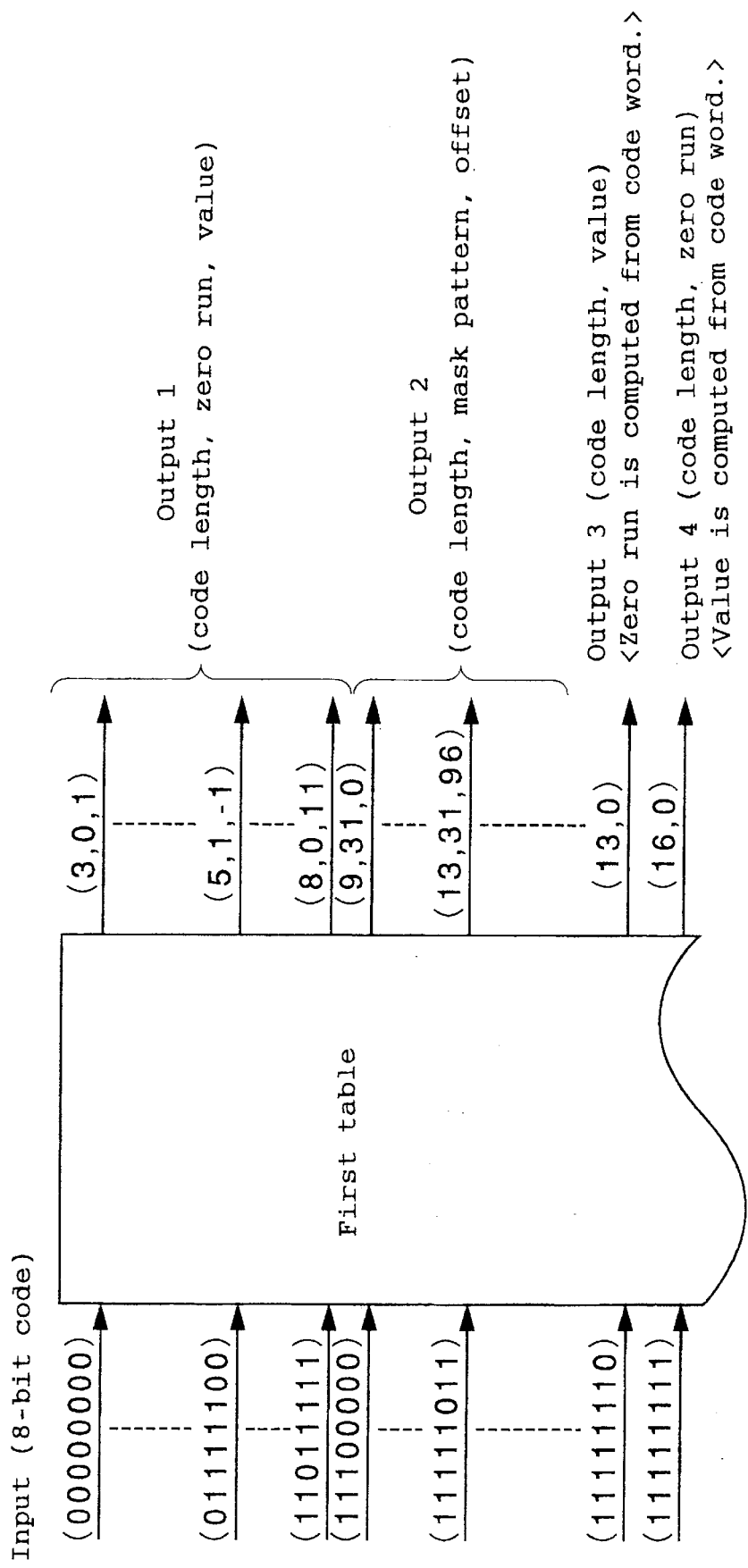
FIG. 13 is a view illustrating a first table in accordance with the 11th embodiment of the present invention.

FIG. 13 is a view illustrating operations before and after reference to the first table in detail. Regarding the configuration of the first table, when an input value is in the range of "00000000" to "11011111," the code length is not more than 8 bits; therefore, code length, zero run and value are output from the first table (output 1).

On the other hand, when an input value is in the range of "11100000" to "11111101," the code lengths is determined; however, since s≧9, decoded data cannot be output by using only the input value. At this time, a mask pattern and an offset value for gaining access to the second table are output (output 2).

When the input value is "11111110," the low-order six bits of the 13-bit code becomes directly a zero run value, and the value is 0 (output 3). Alternatively, when the input value is "11111111," the value can be obtained by simple computation from the low-order 9 bits of a 16-bit code, and the zero run is 0 (output 4).

FIG. 14 is a view illustrating the relationship among the output of the first table, code words to be obtained and the second table. A method of obtaining decoded data at the time when s≧9 will be described below.

The second table is configured such that addresses (initial value: 0) and output values for code words having a code length of 9 to 13 (except for output 3) are arranged in increasing order of code word.

The s-bit code word obtained newly is subject to the mask pattern, i.e., the output of the first table, and AND computation. The value t (dotted portions in the figure) obtained by masking at this time is a value determined uniquely within code words having the same code length. Next, a=f+t is computed by using offset f determined uniquely depending on the code length from the first table. When a is input to the second table, the outputs of the code word corresponding thereto, i.e., zero run and value, can be obtained uniquely.

When a code word "1111011110" is decoded for example, the following occurs.

First, the 8-bit data from the head, i.e., "11110111," is obtained. The code length of the pattern "11110111" is 10; and the mask pattern and offset value f corresponding thereto are "11111" and 32, respectively.

Since the code length is 10, it is found that the code word is "1111011110." Therefore, the mask value t is the AND of the mask pattern "11111" with "11110," that is, 30.

The input address to the second table becomes f+t=30+32=62. The outputs at this time are zero run 0 and value 22, whereby a code word "1111011110" is decoded.

In the variable-length code in the present embodiment, the probability of occurrence of codes having a code length of 8 or less is about 90%. Therefore, the probability of decoding by one table reference operation is about 90%; even in other cases, decoding can be accomplished by two reference operations. Furthermore, since 3 bytes are required for both output 1 and output 2, the size of the first table becomes 3×28=768 bytes. On the other hand, the size of the second table is 2×128=256 bytes, since the input addresses are in the range of 0 to 128, and 2 bytes are required for the parameters, i.e., zero run and value. The sum of the sizes of both tables is 1 K bytes, and can be stored adequately in the cache memory. In addition, in the cases of output 3 and output 4, zero run and value can be obtained by simple computation, if code length is known.

As described above, in the 11th embodiment, when a variable length code is decoded, 8-bit data from the head of a code word is first obtained, and the table is made reference to; if the code length is 9 bits or more, the table is made reference to once again, whereby it is possible to obtain decoded data. Processes required at this time are one-time table access at a probability of about, 90% (two times at the maximum), two-time branch instruction execution at the maximum (usually one time), and simple computations.

Therefore, in accordance with the present embodiment, the number of branch instruction execution times can be decreased significantly in comparison with the variable-length decoding method 1 described in the explanation of the conventional technology. Furthermore, in comparison with the variable-length decoding method 2, the size of table to be made reference to is adequately small, the probability of storage of the table to be accessed in the cache memory is very high, whereby the table data transfer time from the external memory can be decreased significantly. As a result, the decoding computation can be carried out at higher speed in comparison with the variable-length decoding methods 1 and 2.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 40 to 42 of the present invention.

A 12th embodiment, an embodiment of a 12th invention, will be described referring to FIG. 15.

Figure 15:
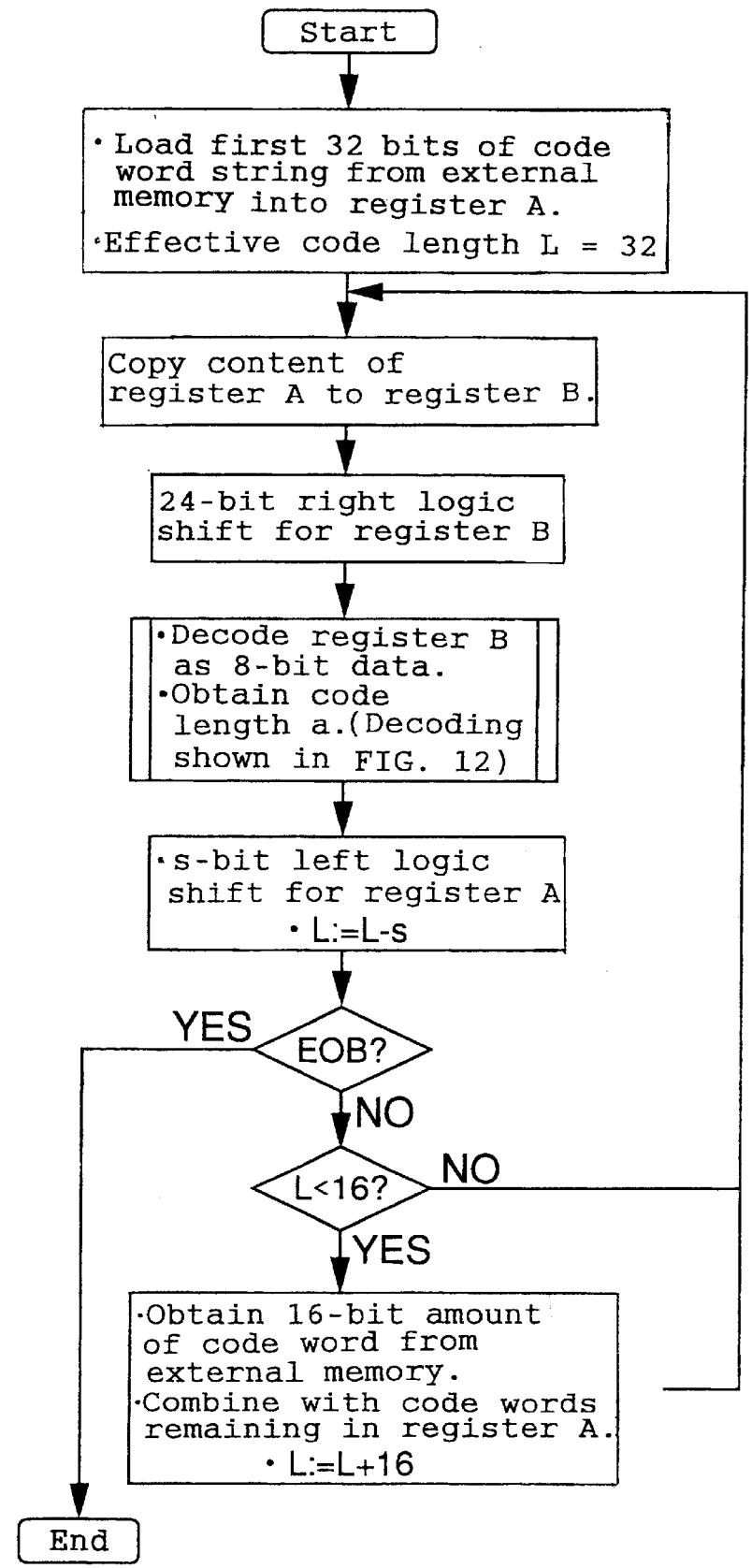
FIG. 15 is a flowchart illustrating a 12th embodiment of the present invention.
Figure 34:
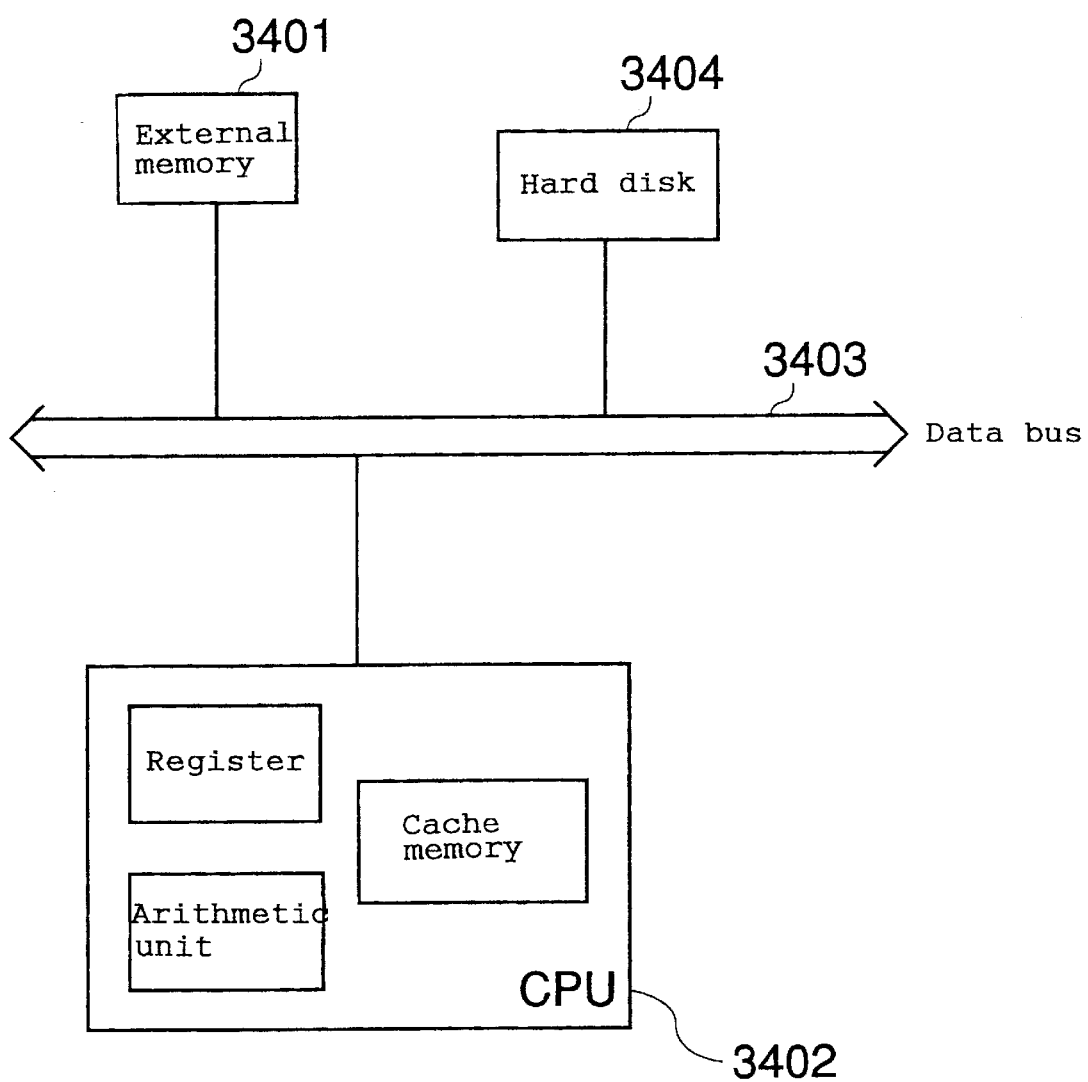
FIG. 34 is a view simply illustrating the configuration of a computer.

FIG. 15 is a flowchart illustrating a variable-length decoding method in accordance with the 12th embodiment. The present embodiment uses the computer having the configuration shown in FIG. 34, and the size of a register is 32 bits.

First, 32-bit data from the head of a code word string stored in the external memory 3401 is loaded in register A, with the head of the code word string at the MSB (Most Significant Bit), and 32 is set as remaining code length L. Next, the content of register A is copied to register B, and registers is subjected to 24-bit right logic shift. By this operation, 8-bit data is obtained from the code word string.

The first table is accessed by using 8-bit data as (the offset of) table reference address, and the predetermined decoding operation in accordance with the first embodiment is carried out to obtain code length s and decoded data. After the decoding, s-bit left logic shift is carried out at register A, whereby a value obtained by subtracting s from L is set as new L. By this operation, the code word having been decoded immediately before is deleted.

This operation is repeated, and if L is less than 16, the subsequent code word is obtained from the external memory 340 and combined with a code word string remaining in register A to form anew code word string. This operation is repeated until EOB appears.

As described above, in accordance with the present embodiment, it is possible to accomplish decoding of a series of variable-length code word strings at high speed.

In the present embodiment, the size of the register is 32 bits; however, this can be accomplished by using an MMX register (64 bits) disclosed by Intel Corporation. In this case, a 64-bit code word is first loaded into the register; when the remaining code length becomes less than 32, 32-bit data should only be obtained from the external memory, and other portions are the same as those of the 32-bit register. By using the MMX register, the number of memory access times for each code word group can be halved approximately, whereby it is possible to carry out variable-length decoding at higher speed.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 43 to 45 of the present invention.

A 13th embodiment, an embodiment of a 13th invention, will be described referring to FIGS. 16 and 17.

Figure 16:
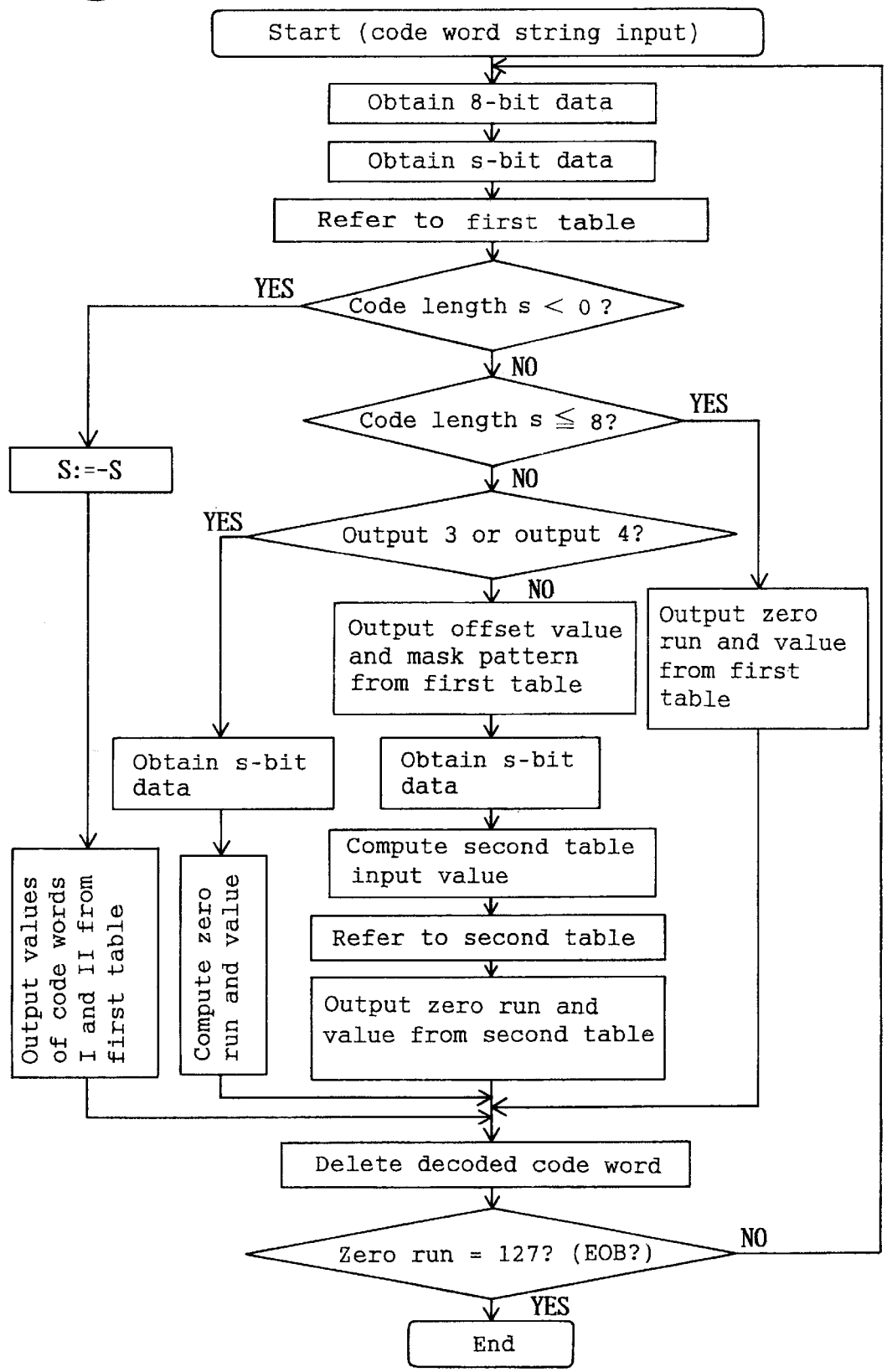
FIG. 16 is a flowchart illustrating a 13th embodiment of the present invention.
Figure 17:
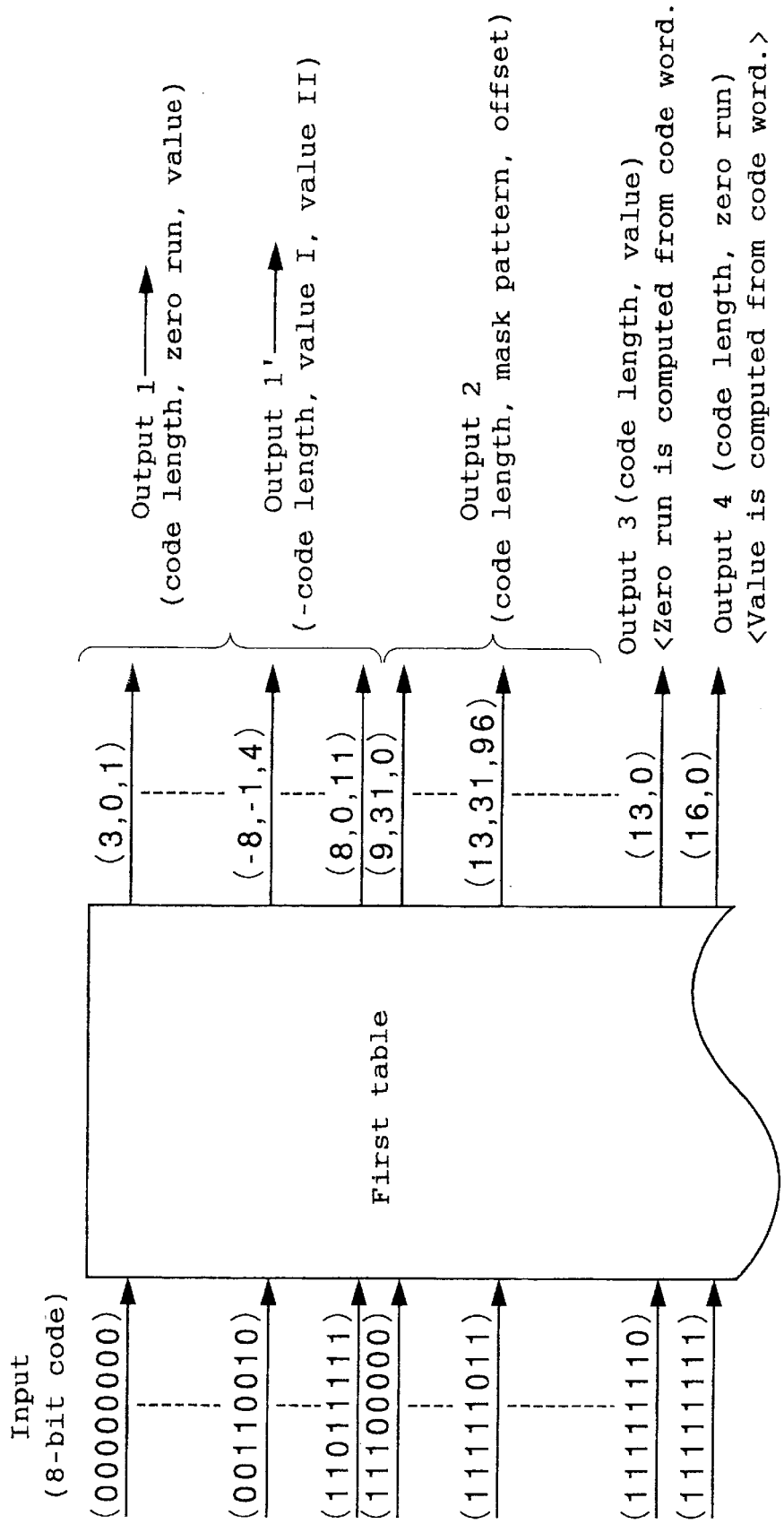
FIG. 17 is a view illustrating a first table in accordance with the 13th embodiment of the present invention.

FIG. 16 is a flowchart illustrating a variable-length decoding method in accordance with the present embodiment, and FIG. 17 is a view illustrating a first table in accordance with the present embodiment.

The present embodiment differs from the 12th embodiment in the following points; in the case when an input 8-bit pattern includes two code words wherein the sum of the code lengths of two continuous code words (hereinafter referred to as codeword I and code word II in this order) is 8 or less, and the zero run lengths of both the code words are 0, the sum of the code lengths of the two code words multiplied by −1 is set instead of code length, the value (value I) of code word I is set instead of zero run, and the value (value II) of code value II is set instead of code length II, as outputs For example, when an 8-bit pattern is "00110010," this includes code word I "001" which is (code length, zero run, value)= (3, 0, −1) and code word II "10010" which is (5, 0, 4). At this time, −8 is set in the area of the code length corresponding to the input "00110010" in the first table, −1 is set in the zero run area, and 4 is set in the value area.

When 8-bit data is obtained from a code word string in the flowchart shown in FIG. 16, and when its value is "00110010," code length s=−8 is output. At this time, −s is taken as a code length and set to 8. Furthermore, when the value output from the zero run area is read as value I, and the value output from the value area is read as value II, the zero runs of both code words become 0, whereby the decoding of the two code words can be accomplished by one-time table reference.

The other operations are similar to those of the 12th embodiment.

As described above, in accordance with the present embodiment, when code words having short code lengths continue, two code words can be decoded at one time by one-time table reference, whereby decoding can be carried out at higher speed.

In the explanation of the present embodiment, it is assumed that value I and value II are stored in the zero run area and the value area of the first table, respectively; however, they may be stored in reverse. In addition, it is assumed that the code length is multiplied by −1 to identify the code word string in the case when two code words are decoded at one time; however, other methods may be used if identification can be made. Furthermore, if a four-byte area is held for one input bit pattern, data assignment for code length, the zero run of code word I, the value of code, word I and the value of code word II is carried out for example; and in the case when the sum of code lengths is 8 bits and the zero run of code word II is 0 (the zero run of code word I is not required to be 0), expansion can be carried out.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium The above-mentioned embodiment mainly corresponds to claims 46 to 48 of the present invention.

A 14th embodiment, an embodiment of a 14th invention, will be described referring to FIGS. 18 and 19.

Figure 18:
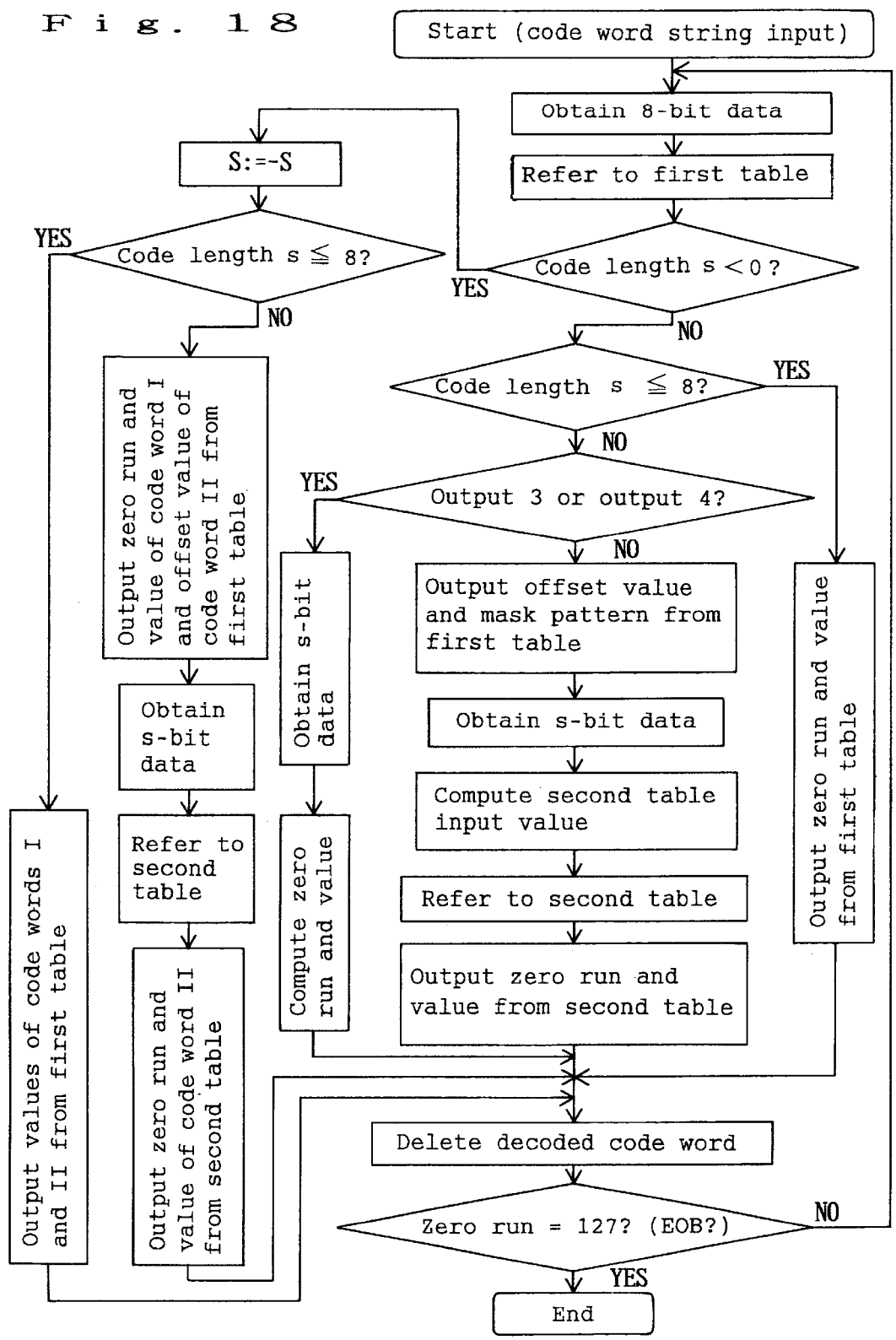
FIG. 18 is a flowchart illustrating a 14th embodiment of the present invention.
Figure 19:
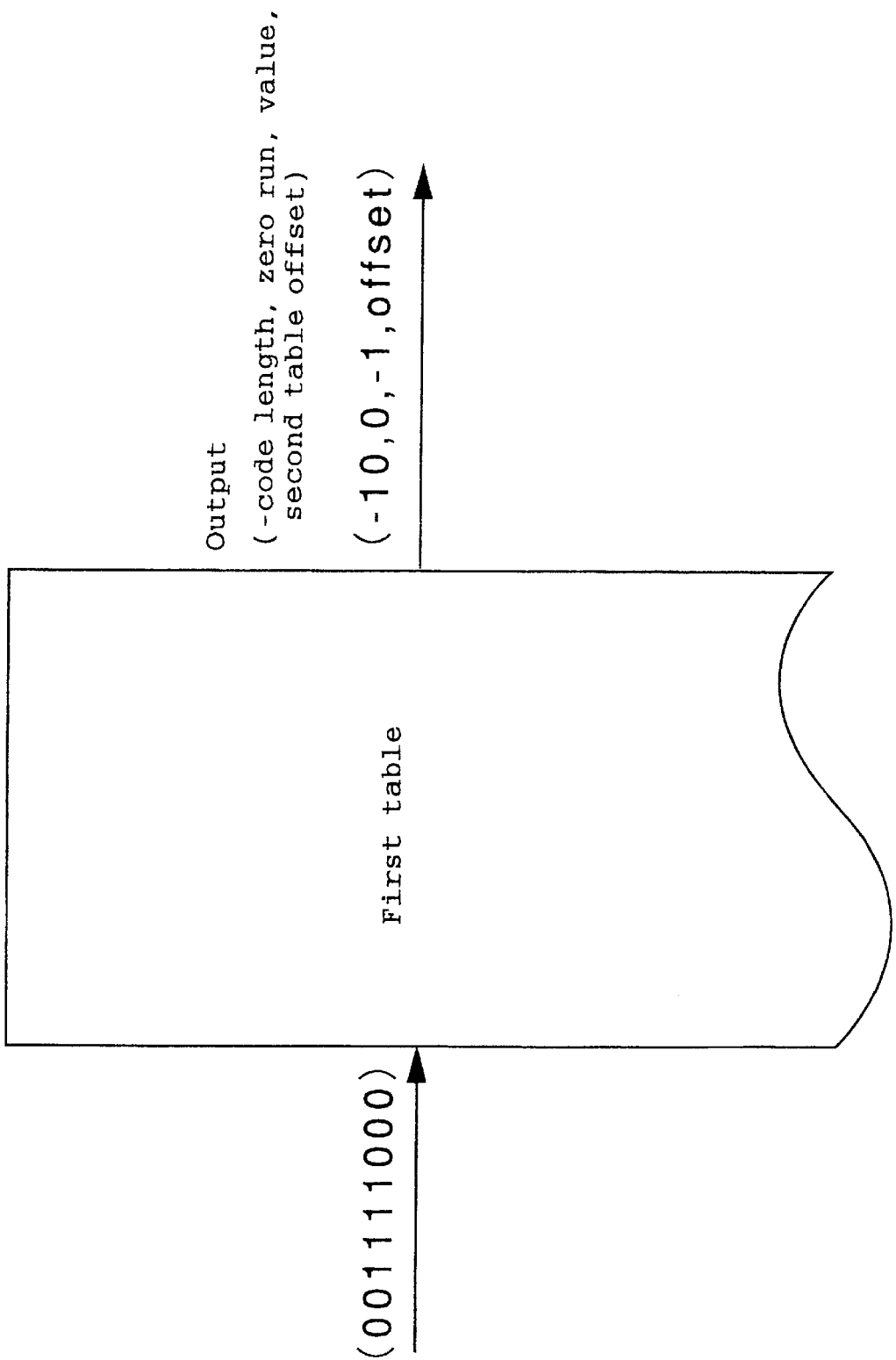
FIG. 19 is a view simply illustrating a first table in accordance with the 14th embodiment of the present invention.

FIG. 18 is a flowchart illustrating a variable-length decoding method in accordance with the present embodiment, and FIG. 19 is a view illustrating a first table in accordance with the present embodiment.

The present embodiment differs from the 13th embodiment in the following points; for two continuous code words (hereinafter referred to as code word I and code word II in this order), when the code length of codeword I is 7 or less, the sum of the code lengths of code word I and code word II is 9 or more, and the code length of the code word II is determined as "8−the code length of code word I" bit, the first table outputs a code length multiplied by −1, the zero run and value of code word I, and the second table access offset for decoding code word II.

For example, when it is assumed that 8-bit data having been obtained is "00111000" for example as shown in FIG. 19, "001" becomes code word I (code length 3), and the zero run and value of code word I, i.e., −1 and 0, are output. In addition, since the code length of the code word beginning with the remaining "11000" is determined as 7, "−10" obtained by multiplying the sum, i.e., 10, of the code length 3 of code word I and the code length 7 of code word II by −1 is output as the code length, and furthermore, an offset for gaining access to the second table for code word II is output.

Other operations are the same as those of the 13th embodiment.

As described above, in accordance with the present embodiment, two code words can be decoded by one-time code word obtaining through twice table reference to the first table and the second table, whereby decoding can be carried out at higher speed.

In the 11th to 14th embodiments, the code length of each code word is output as the output of the first table; however, if the code length, instead of code length itself, can be determined uniquely, other value may be used.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 49 to 51 of the present invention.

A 15th embodiment, an embodiment of a 15th invention, will be described referring to FIG. 20.

Figure 20:
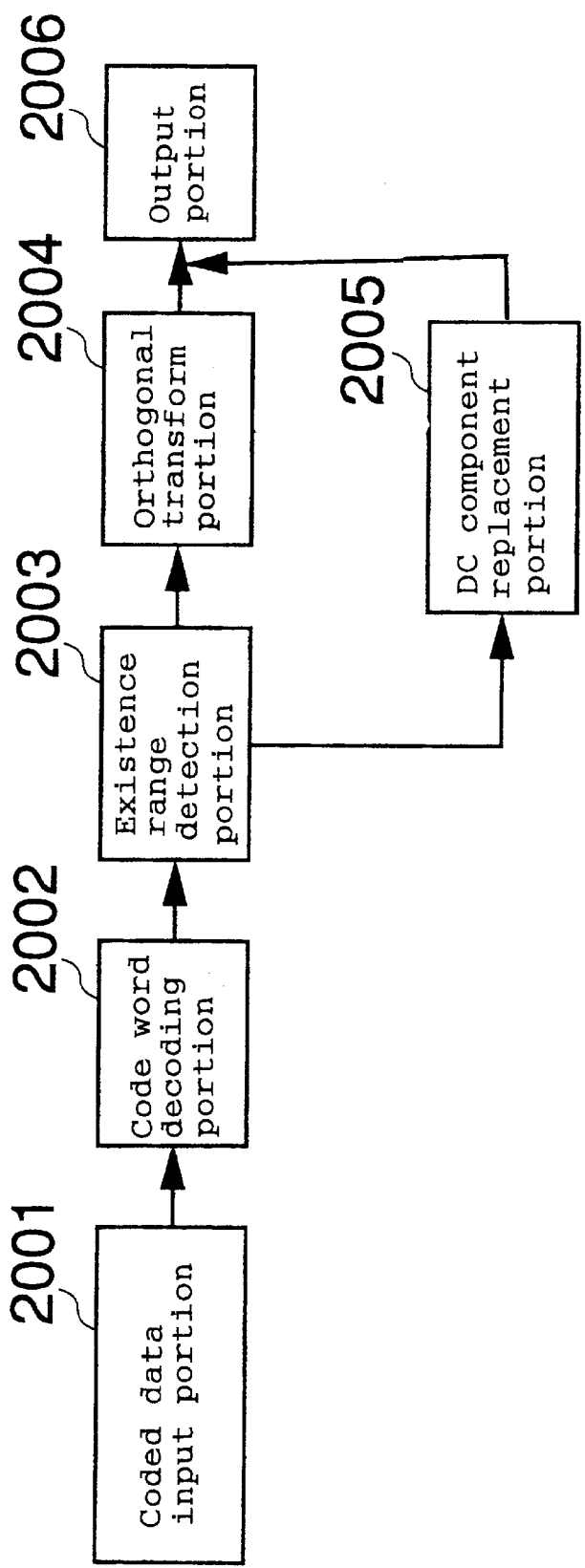
FIG. 20 is a block diagram illustrating a 15th embodiment of the present invention.

FIG. 20 is a block diagram illustrating the configuration of a decoding apparatus in accordance with the present embodiment. In FIG. 20, the numeral 2001 represents a coded data input portion, the numeral 2002 represents a code word decoding portion, the numeral 2003 represents an existence range detection portion, the numeral 2004 represents an orthogonal transform portion, the numeral 2005 represents a DC component replacement portion, and the numeral 2006 represents an output portion.

The present embodiment is applied to inverse orthogonal transform used at the time when coded data is decoded by using orthogonal transform. First, coded data having been input from the coded data input portion 2001 shown in FIG. 20 is converted from a code word into an orthogonal coefficient component value by the code word decoding portion 2002. All the orthogonal coefficient component values of a block before decoding are initialized to 0 at this time; in the case when the orthogonal coefficient component value is not 0 at the time of decoding, the orthogonal coefficient component value is overwritten at a position corresponding thereto in a two-dimensional block At the same time, with respect to the overwritten two-dimensional position, the existence position of the orthogonal coefficient component value in the block is stored by the existing range detection portion 2003. In addition, the existence position is renewed only when a high-frequency component is generated in the horizontal or vertical direction in the same block.

In the case when the existence position of the above-mentioned stored orthogonal coefficient component value indicates the existence of an AC component after the orthogonal coefficient component value for one block is obtained, the DC coefficient component or its multiple value is set to all pixel values by the DC component replacement portion 2005, and output is carried out from the output portion 2006. Conversely, when the existence range of the orthogonal coefficient component value is limited to the DC coefficient component, ordinary orthogonal transform is carried out by the orthogonal transform portion 2004, and output is carried out from the output portion 2006.

By using the present embodiment, the existence position of the DC coefficient component is detected only when the non-zero orthogonal coefficient component is generated at the time of code word decoding; therefore, the amount of computation for position detection is very small, whereby the amount of computation for orthogonal transform can be decreased significantly.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 91 to 93 of the present invention.

A 16th embodiment, an embodiment of a 16th invention, will be described referring to FIG. 21.

Figure 21:
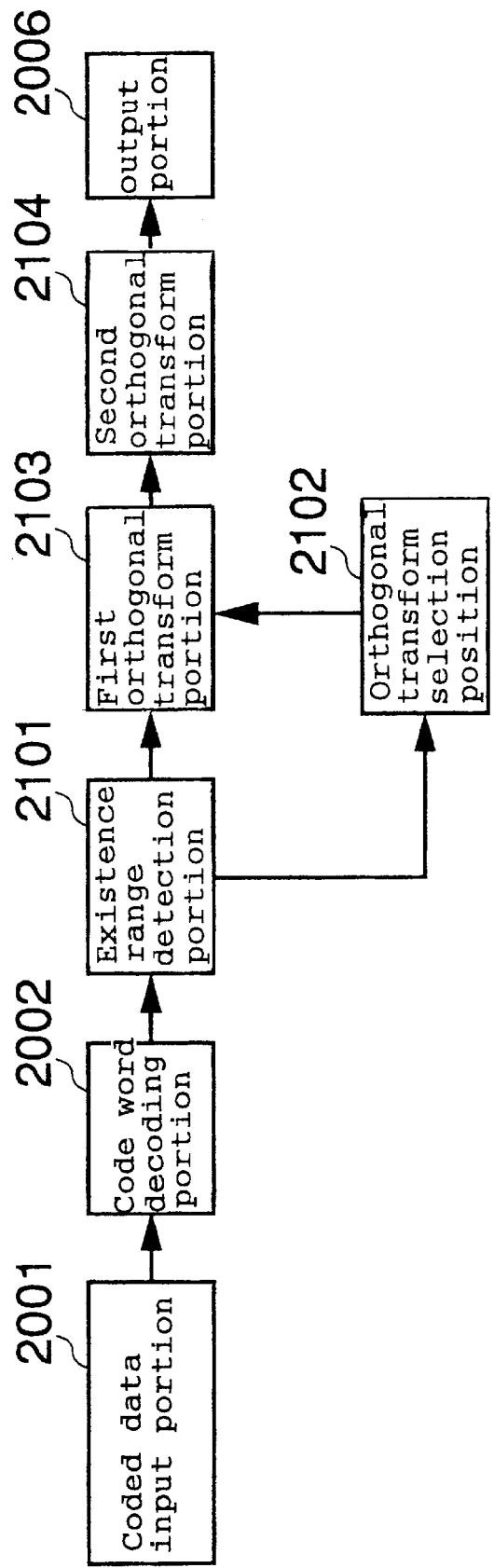
FIG. 21 is a block diagram illustrating a 16th embodiment of the present invention.

FIG. 21 is a block diagram illustrating the configuration of a decoding apparatus in accordance with the present embodiment. The numeral 2101 represents an existence range detection portion, the numeral 2102 is an orthogonal transform selection position, the numeral 2103 represents a first orthogonal transform portion, and the numeral 2104 represents a second orthogonal transform portion.

The operations of the coded data input portion 2001 and the code word decoding portion 2002 shown in FIG. 21 are the same as those shown in FIG. 20. At the existence range detection portion 2101, depending on the result of the code word decoding portion 2002, the existence positions of the non-zero orthogonal coefficient components are stored in orthogonal transform units in the vertical direction.

Next, at the orthogonal transform selection portion. 2102, the operation of the first orthogonal transform portion 2103 is controlled depending on the maximum position of the non-zero orthogonal transform coefficient component in orthogonal transform units in the vertical direction. At this time, at the first orthogonal transform portion 2103, two kinds of orthogonal transform, i.e., ordinary orthogonal transform and simplified orthogonal transform wherein a DC coefficient component or its multiple is used as all transform values, are switched. In this way, actual orthogonal transform computation is carried out only for orthogonal transform units wherein the DC orthogonal component is present. In addition, the orthogonal coefficient component having been subjected to orthogonal transform in the vertical direction is subjected to orthogonal transform in the horizontal direction by the second orthogonal transform portion 2104, and output is carried out to the output portion 2106.

The present embodiment can determine whether actual orthogonal transform is carried out in the horizontal or vertical orthogonal transform units of a two-dimensional block; therefore, the amount of computation at the time of orthogonal transform for given image information can be decreased.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 94 to 96 of the present invention.

A 17th embodiment, an embodiment of a 17th invention, will be described referring to FIG. 22.

Figure 22:
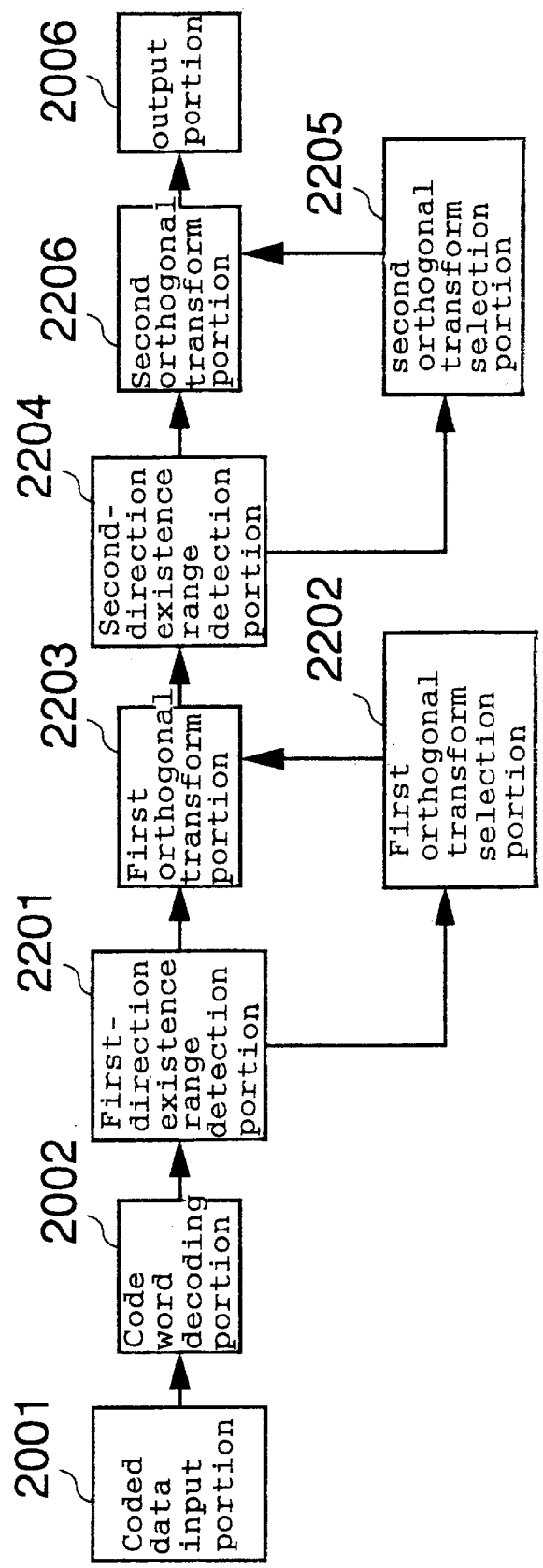
FIG. 22 is a block diagram illustrating a 17th embodiment of the present invention.

FIG. 22 is a block diagram illustrating the configuration of a decoding apparatus in accordance with the present embodiment. The numeral 2201 represents a first-direction existence range detection portion, the numeral 2202 is a first-direction orthogonal transform selection portion, the numeral 2203 represents a first orthogonal transform portion, the numeral 2204 represents a second-direction existence range detection portion, the numeral 2205 is a second-direction orthogonal transform selection portion, and the numeral 2206 represents a second orthogonal transform portion The operations of the coded data input portion 2001 and the code word decoding portion 2002 shown in FIG. 22 are the same as those shown in FIG. 20. At the first existence range detection portion 2201, just as in the case of the existence range detection portion 2101 shown in FIG. 21, the existence positions of the non-zero orthogonal coefficient components are stored in orthogonal transform units in the vertical direction. Next, at the first orthogonal transform selection portion 602, the operation of the first orthogonal transform portion 2203 is controlled depending on the maximum position of the non-zero orthogonal transform coefficient component in orthogonal transform units in the vertical direction. At this time, at the first orthogonal transform portion 2203, two kinds of orthogonal transform, i.e., ordinary orthogonal transform and simplified orthogonal transform wherein a DC coefficient component or its multiple is used as all transform values, are switched.

Next, the second-direction existence range detection portion 2204 receives the output from the first orthogonal transform portion, and stores the existence range of the non-zero orthogonal coefficient components in orthogonal transform units in the horizontal direction. At the second orthogonal transform selection portion 2205, the operation of the second orthogonal transform portion 2206 is controlled depending on the maximum position of the non-zero orthogonal transform coefficient component in orthogonal transform units in the horizontal direction. At this time, at the second orthogonal transform portion 2206, two kinds of orthogonal transform, i.e, ordinary orthogonal transform and simplified orthogonal transform wherein a DC coefficient component or its multiple are used as all transform values, are switched. In this way, pixel values obtained by orthogonal transform in the first and second directions are output from the output portion 2006.

In the present embodiment, in addition to the 15th embodiment, the amount of computation from the second-direction orthogonal transform can be decreased, whereby a greater effect can be obtained.

In the 16th and 17th embodiments, two kinds of orthogonal transform methods are switched at the first or second orthogonal transform portion; however, it is possible to select other orthogonal transform method depending on the number of orthogonal coefficient components to be used.

Furthermore, in the case of coding using ordinary orthogonal transform, orthogonal coefficient components of a two-dimensional block are subjected to rearrangement referred to as zigzag scanning so as to be coded in the order from low-frequency components to high-frequency components two-dimensionally. In this case, the existence range of the non-zero orthogonal coefficient component in each orthogonal transform unit can be represented by the position of the non-zero orthogonal coefficient component generated last in each orthogonal transform unit. Therefore, the existence range can be detected more easily.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 97 to 99 of the present invention.

An 18th embodiment, an embodiment of an 18th invention, will be described referring to FIGS. 23 and 24.

Figure 23:
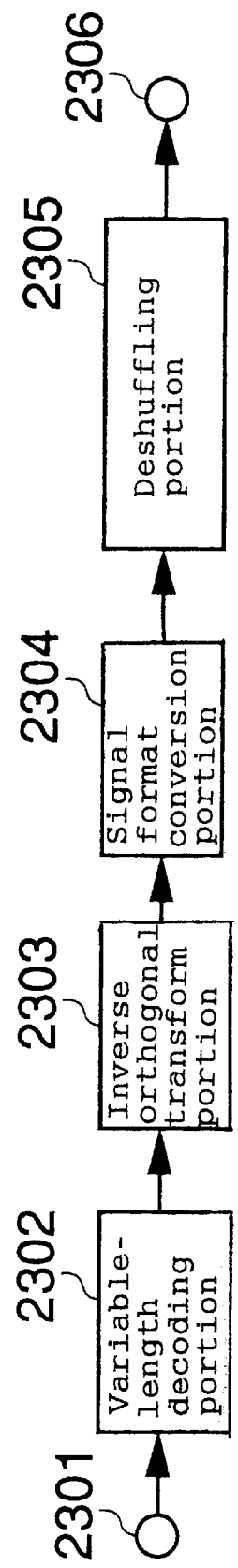
FIG. 23 is a block diagram illustrating an 18th embodiment of the present invention.

FIG. 23 is a block diagram illustrating the configuration of a decoding apparatus in accordance with the present embodiment. In FIG. 23, the numeral 2301 represents an input terminal, the numeral 2302 represents a variable-length decoding portion, the numeral 2303 represents an inverse orthogonal transform portion, the numeral 2304 represents a signal format conversion portion for converting a YUV format signal into an RGB format signal, the numeral 2305 represents a deshuffling portion and the numeral 2306 represents an output terminal.

The variable-length coded YUV format image signal having been input from the input terminal 2301 is decoded by the variable-length decoding portion 2302. The decoded signal is converted into an ordinary YUV format signal by the inverse orthogonal transform portion 2303, and converted immediately into an RGB format signal for each coordinate by the signal format conversion portion 2304. The RGB format signal obtained from the signal format conversion portion 2304 is deshuffled by the deshuffling portion 2305, and output from the output terminal 2306.

Figure 24:
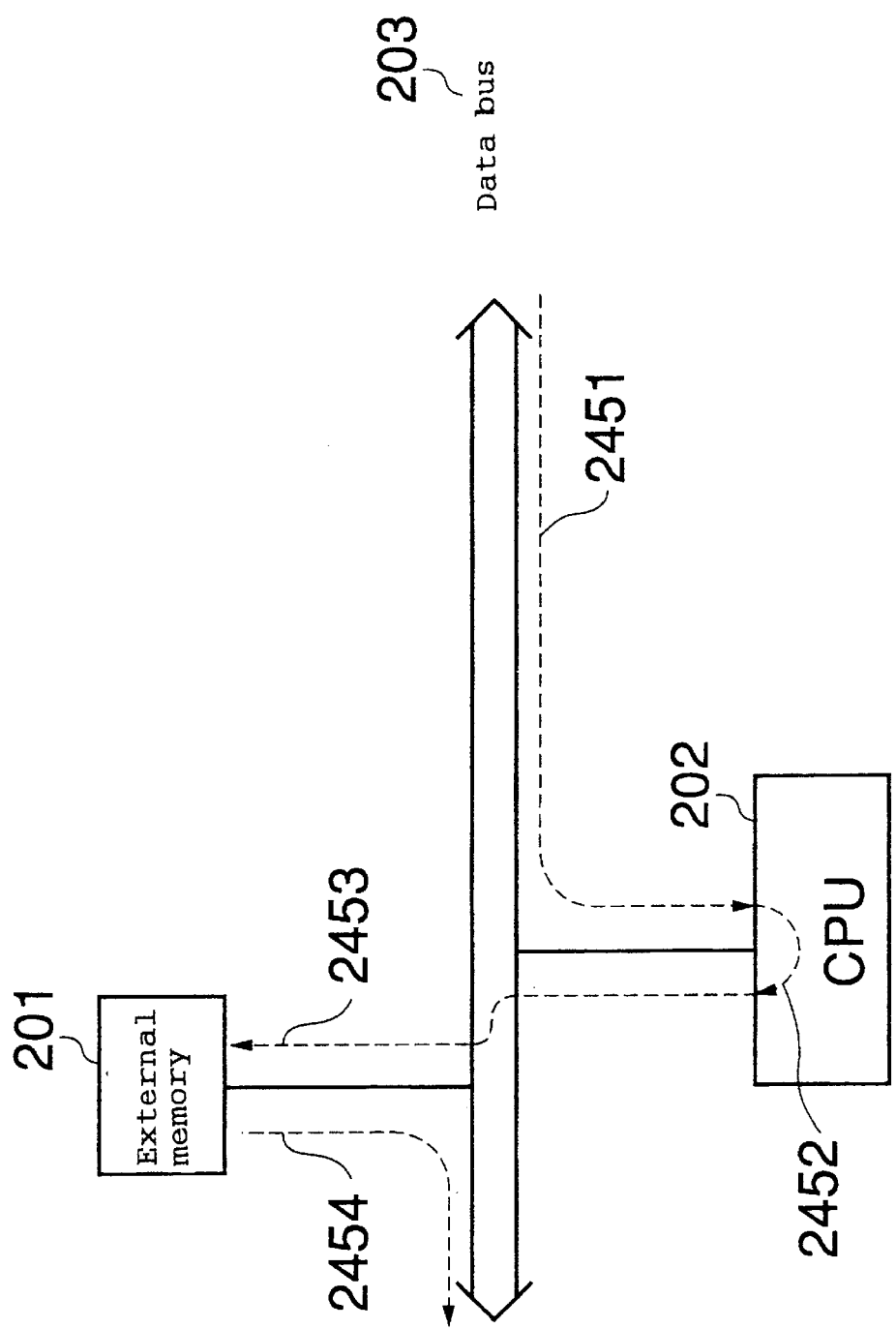
FIG. 24 is a schematic view illustrating the flow of data at the time when the 18th embodiment of the present invention is accomplished by using a computer.
Figure 25:
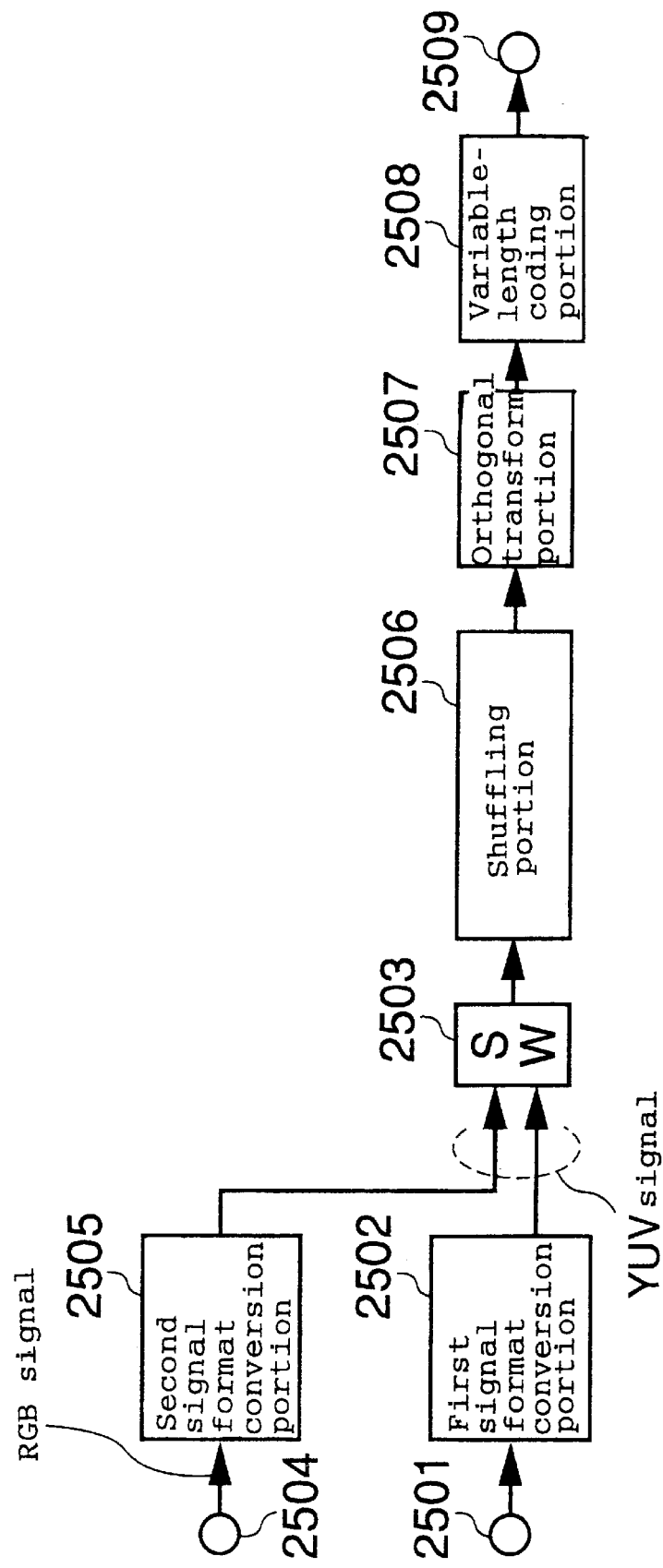
FIG. 25 is a block diagram illustrating conventional image signal coding.
Figure 27:
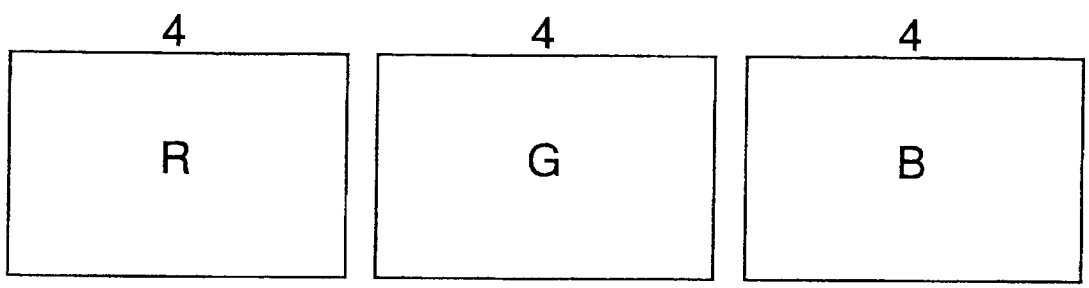
FIG. 27 is a block diagram illustrating the configuration of an RGB format signal.
Figure 28:
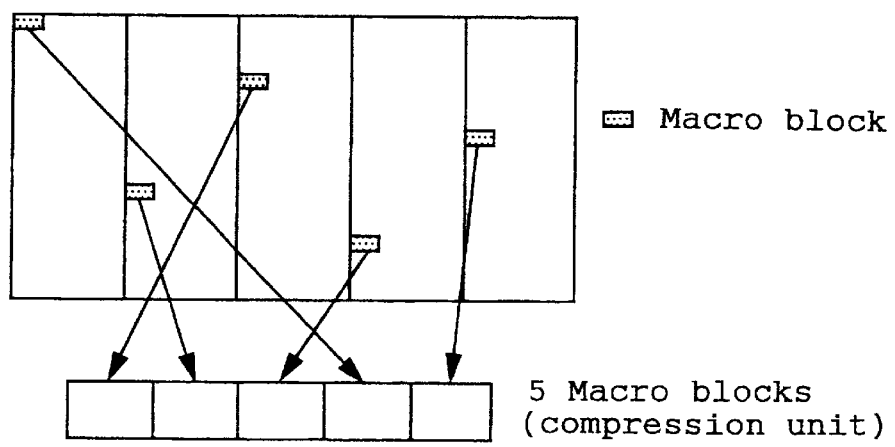
FIG. 28 is a block diagram illustrating shuffling.
Figure 30:
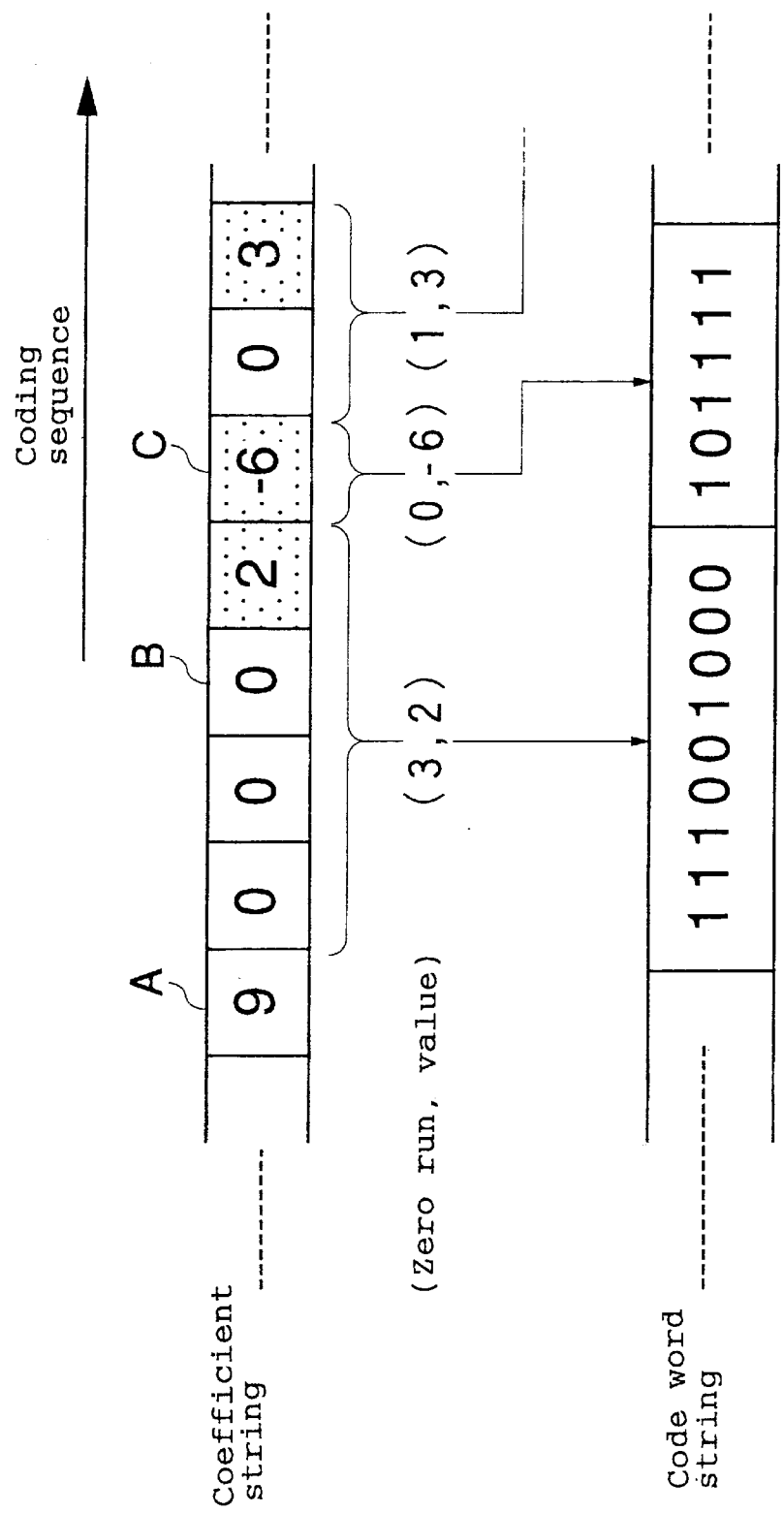
FIG. 30 is a view illustrating variable-length coding for DVC.
Figure 31:
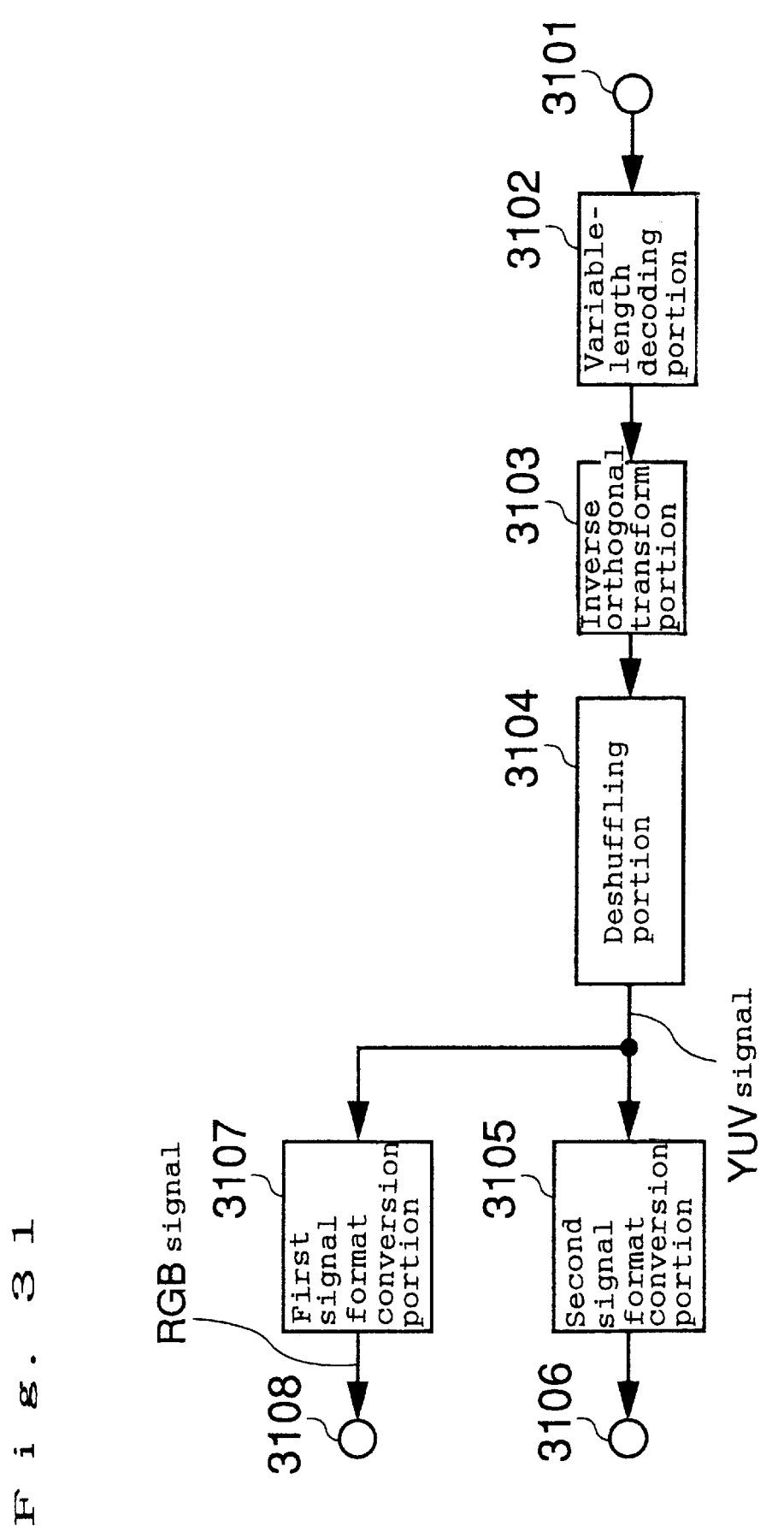
FIG. 31 is a block diagram illustrating conventional image signal decoding.
Figure 32:
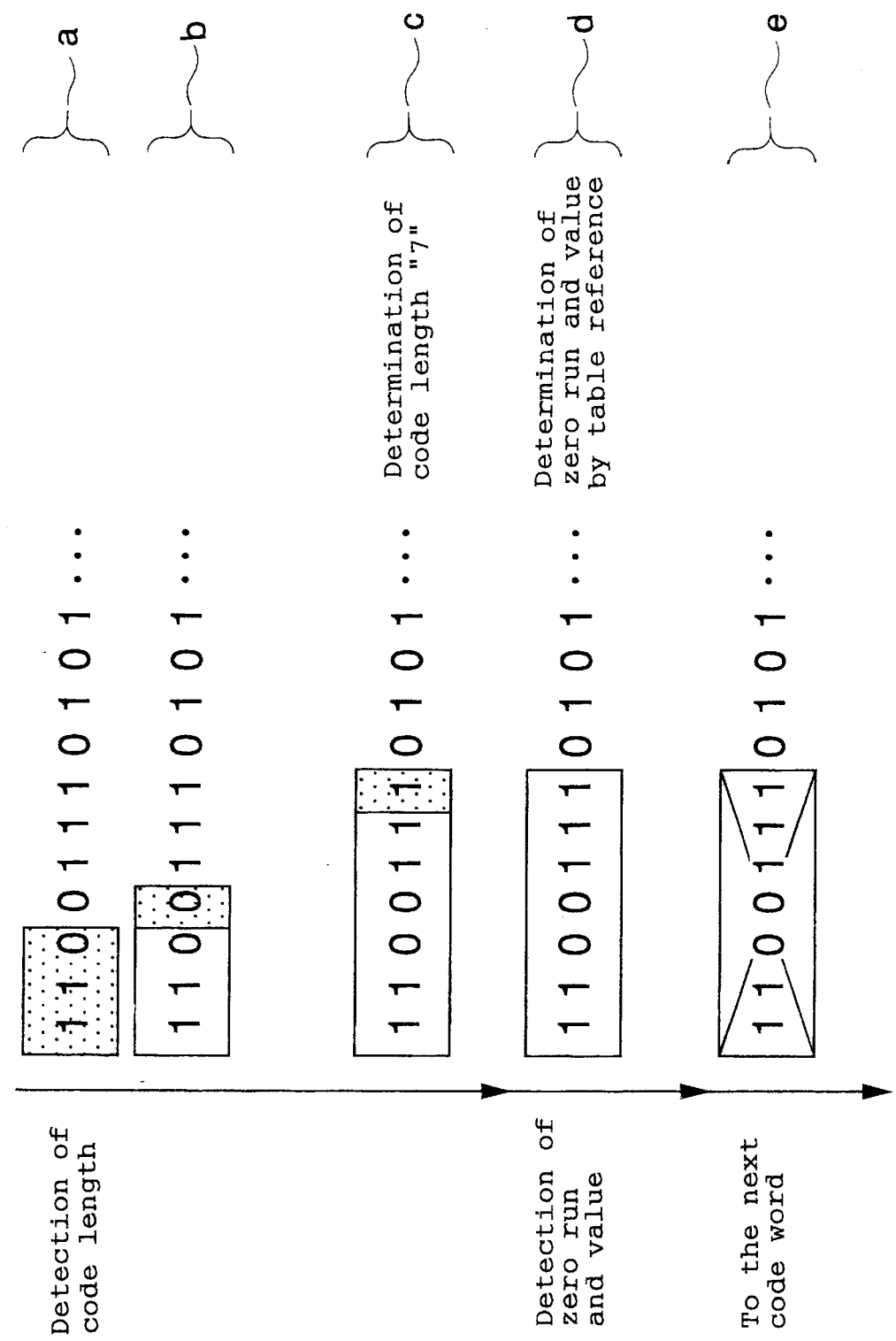
FIG. 32 is a view illustrating conventional variable-length coding method 1.
Figure 33:
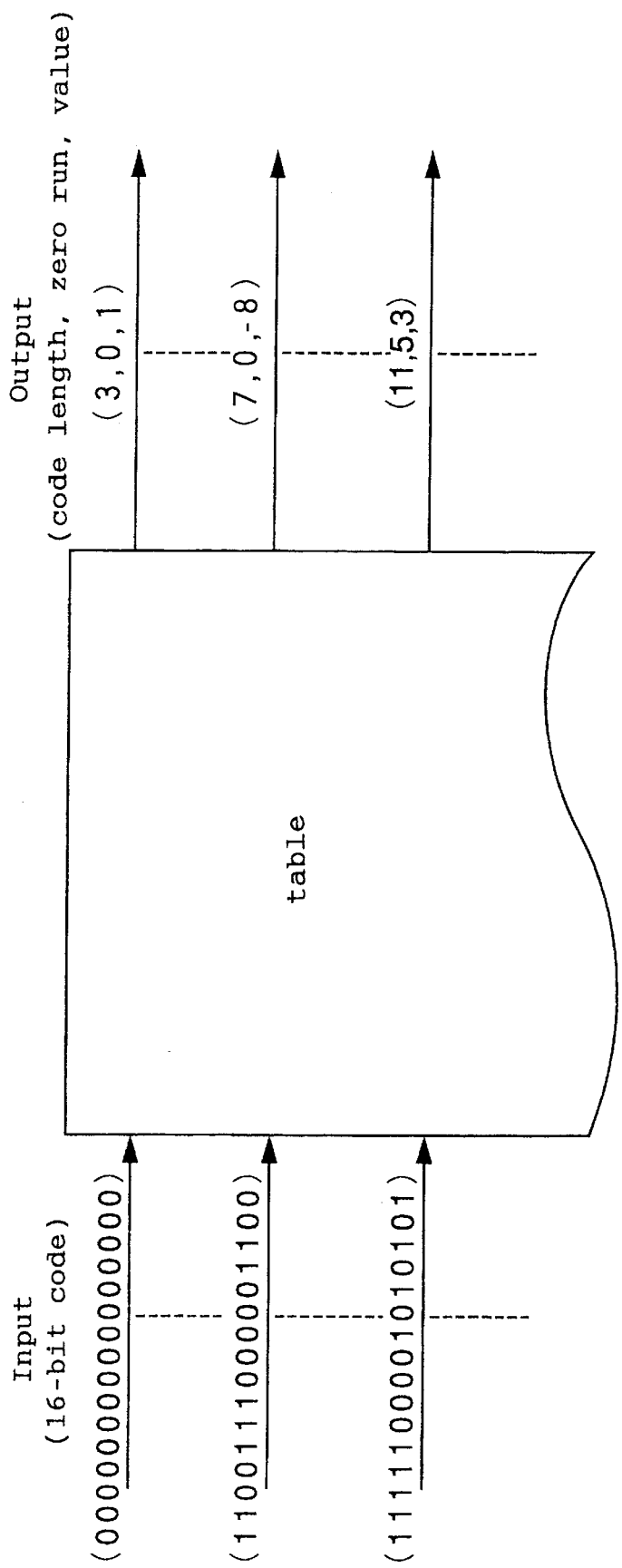
FIG. 33 is a view illustrating conventional variable-length coding method 2.

FIG. 24 is a view illustrating the flow of data at the time when the above-mentioned image signal processing is carried out by using a computer.

The coded YUV format signal having been input from a data bus 203 is taken in a CPU 202 (2451) and subjected to decoding, inverse orthogonal transform and signal format conversion continuously (2452). The image signal having been subjected to signal format conversion is written in an external memory 201 at an address generated in accordance with a shuffling pattern. At this time, an image to be reproduced is properly stored in the external memory 201; therefore, by mapping the image signal in the external memory 202 over a display device such as VRAM or file, the image signal can be displayed, stored or the like (2454).

Figure 36:
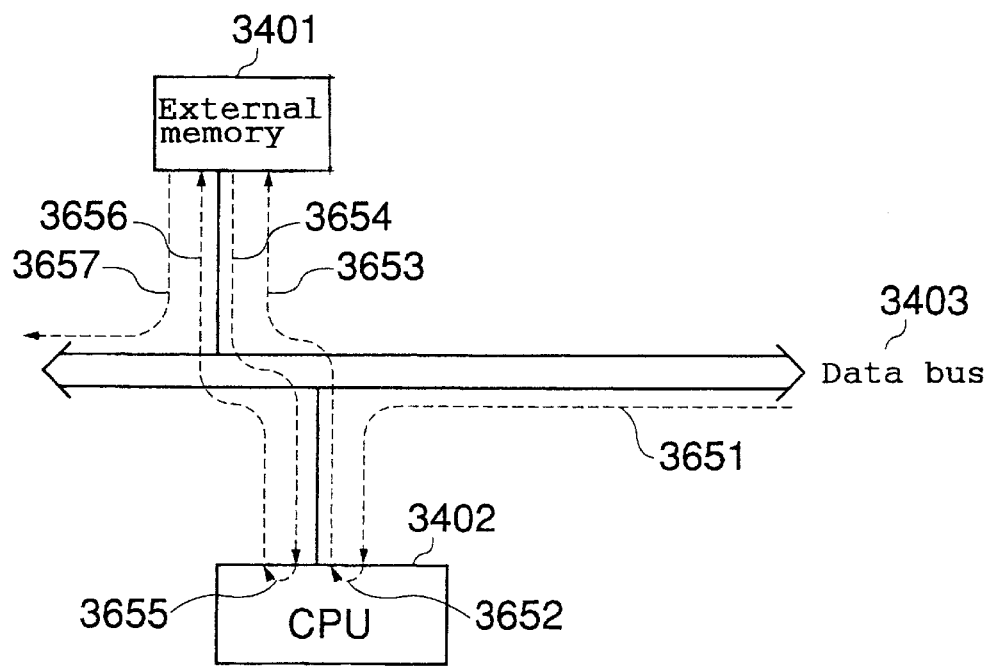
FIG. 36 is a schematic view illustrating the flow of data at the time when conventional decoding is accomplished by using a computer.

As described above, when the present embodiment is compared with the conventional example shown in FIG. 36, the operation for writing data into the memory in order to carry out deshuffling and the operation for reading data from the memory in order to carry out signal format conversion can be omitted after inverse orthogonal transform; therefore, the overall processing time can be shortened. As a result, data transfer between the CPU and the external memory becomes unnecessary, and the processing time can be shortened significantly.

In the present embodiment, an RGB format signal is used as an image signal to be output; however, the signal format to be converted by the signal format conversion portion is not limited to the RGB format signal, and the same effects can be obtained regardless of the format.

A recording medium, such as a magnetic recording medium or an optical recording medium, wherein programs for executing the functions of all or parts of the means in accordance with the present embodiment by using a computer are recorded, may be created, and the same operation as that described above may be carried out by using such a medium.

The above-mentioned embodiment mainly corresponds to claims 109 to 111 of the present invention.

All the embodiments having been described above can be accomplished by using software, or can be carried out via a recording medium or a transmission medium. In addition, it is possible to configure a coding method, apparatus and program, wherein the above-mentioned plural technologies are combined and orthogonal transform is included.

Figure 37A:
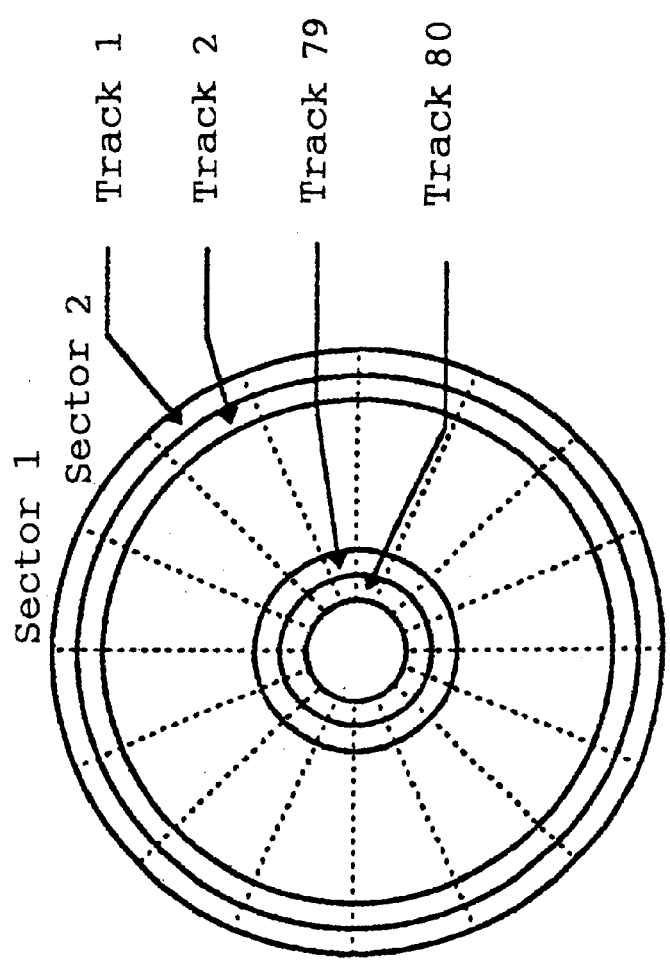
FIG. 37(*a*) is a view illustrating physical format of a floppy disk.
Figure 37B:
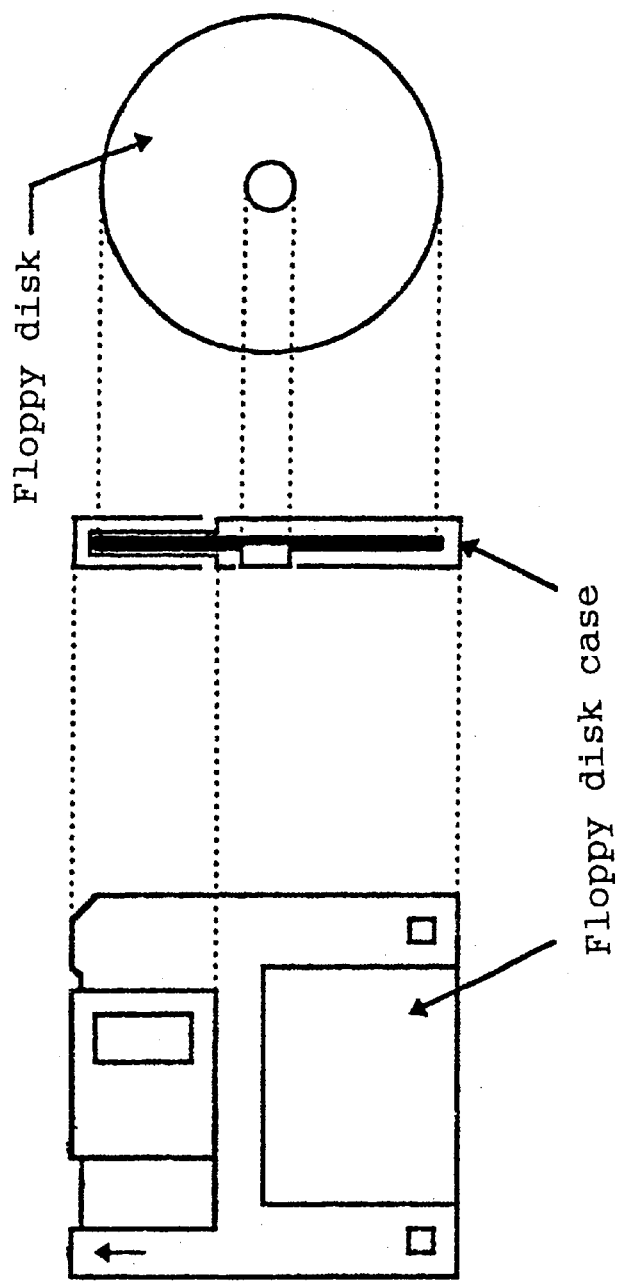
Figure 37C:
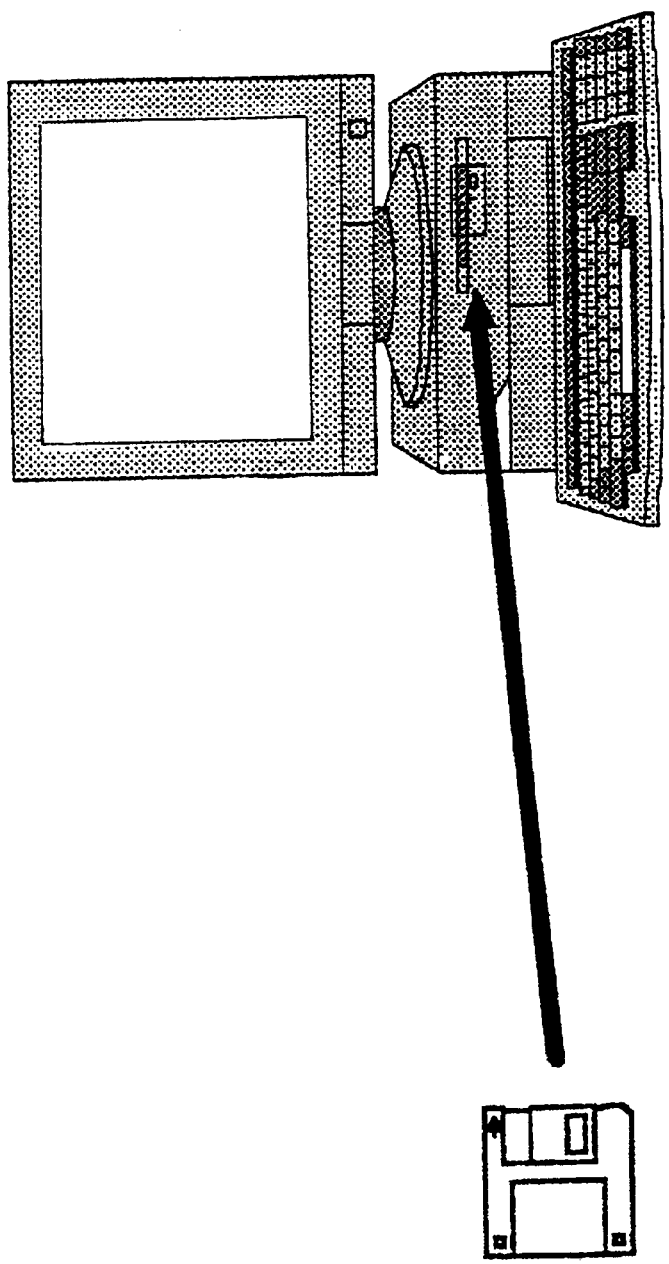

Furthermore, by using programs to accomplish the present invention, and by recording the programs on a recording medium such as a floppy disk and by transferring the programs, the present invention can easily be carried out by using another independent computer system. FIGS. 37(a) to 37(c) illustrate a case when this is attained by using a floppy disc.

FIG. 37(a) is a view showing an example of the physical format of a floppy disk used as the main body of a recording medium. Tracks are created concentrically from the outer circumference to the inner circumference, and each track area is divided into 16 sectors in the circumferential direction. Programs are recorded in accordance with the areas allocated in this way.

FIG. 37(b) is a view illustrating a case for accommodating the floppy disk. The front view and the sectional view of the floppy disk and the floppy disk are shown from the left. By accommodating the floppy disk in the case in this way, the disk can be protected against dust and external impact, whereby it can be transferred safely.

FIG. 37(c) is a view wherein programs are recorded to and reproduced from the floppy disk. By connecting a floppy disk drive to a computer system as shown in the figure, programs can be recorded to and reproduced from the disk. The disk is inserted into and taken out from the floppy disk via a slot. During recording, programs are recorded from the computer system to the floppy disk. During reproduction, the floppy disk drive reads programs from the disk and transfers them to the computer system.

INDUSTRIAL USABILITY

As described above, in accordance with the present invention, in coding processing, for example, the number of times register values are saved on memory at the time for orthogonal transform computation can be decreased significantly; therefore, the time of computation can be shortened significantly. In addition, by switching the orthogonal transform method depending on the existence position of the non-zero orthogonal coefficient component, the amount of computation for orthogonal transform can be decreased significantly. Furthermore, in decoding processing, the operation of writing data into the memory in order to carry out deshuffling after inverse orthogonal transform and the operation of reading data from the memory in order to carry out signal format conversion can be omitted; therefore, the overall processing time can be reduced. As a result, data transfer between the CPU and the external memory becomes unnecessary, and the processing time can be shortened significantly.

What is claimed is:

1. A decoding method for subjecting coded data to variable-length decoding, inverse orthogonal transform and signal format conversion to obtain image data,
    at the time when the maximum code word length per code word for said coded data is n (n: a natural number),
    said variable-length decoding step comprising:
    (1) a first table reference step for referring to a first table by using j-bit data of said code word as an input, for outputting code-length-related information and decoded data from said first table when code length s is j or less, and for outputting code-length-related information and second table access information when code length s is j+1 or more, and
    (2) a second table reference step for computing a second table address from said second table access information and said s-bit data of said code word, for referring to said second table in accordance with said second table address, and for outputting decoded data.

2. A decoding apparatus comprising a variable-length decoding means for variable-length decoding coded data and a means for carrying out inverse orthogonal transform and signal format conversion by using the result of said decoding to obtain image data,
    at the time when the maximum code word length per code word for said coded data is n (n: a natural number),
    said variable-length decoding means comprising:
    (1) a first table reference means for referring to a first table by using j-bit data of said code word as an input, for outputting code-length-related information and decoded data from said first table when code length s is j or less, and for outputting code-length-related information and second table access information when code length s is j+1 or more, and
    (2) a second table reference means for computing a second table address from said second table access information and said s-bit data of said code word, for referring to said second table in accordance with said second table address, and for outputting decoded data.

3. A recording medium including recorded coding programs to be executed by a computer for subjecting coded data to variable-length decoding, inverse orthogonal transform and signal format conversion to obtain image data,
    at the time when the maximum code word length per code word for said coded data is n (n: a natural number),
    said variable-length decoding step comprising:
    (1) a step for referring to a first table by using j-bit data of said code word as an input, for outputting code-length-related information and decoded data from said first table when code length s is j or less, and for outputting code-length-related information and second table access information when code length s is j+1 or more, and
    (2) a step for computing a second table address from said second table access information and said s-bit data of said code word, for referring to said second table in accordance with said second table address, and for outputting decoded data.

4. A decoding method for subjecting coded data to variable-length decoding, inverse orthogonal transform and signal format conversion to obtain image data,
    at the time when said coded data is a code word string subjected to variable-length coding, the maximum code word length per code word of which is n (n: a natural number),
    said variable-length decoding step comprising:
    (1) a code word string obtaining step for obtaining j-bit data from the head of said code word string,
    (2) a first table reference step for referring to a first table by using said obtained j-bit data as an input, for outputting code-length-related information and decoded data from said first table when code length s is j or less, and for outputting code-length-related information and second table access information from said first table when code length s is j+1 or more,
    (3) a second table reference step for obtaining s-bit data from the head of said code word string, for computing a second table address from said second table access information and said s-bit data, for referring to said second table in accordance with said second table address, and for outputting decoded data, and (4) a bit shifting step for obtaining code length s from said code-length-related information, for deleting the s-bit code from the head of said code word string, and for repeating this operation until the occurrence of an end code.

5. A decoding apparatus comprising a variable-length decoding means for variable-length decoding coded data and a means for carrying out inverse orthogonal transform and signal format conversion by using the result of said decoding to obtain image data, at the time when said coded data is a code word string subjected to variable-length coding, the maximum code word length per code word of which is n (n: a natural number), said variable-length decoding means comprising:
(1) a code word string obtaining means for obtaining j-bit data from the head of said code word string,
(2) a first table reference means for referring to a first table by using said obtained j-bit data as an input, for outputting code-length-related information and decoded data from said first table when code length s is j or less, and for outputting code-length-related information and second table access information from said first table when code length s is j+1 or more,
(3) a second table reference means for obtaining s-bit data from the head of said code word string, for computing a second table address from said second table access information and said s-bit data, for referring to said second table in accordance with said second table address, and for outputting decoded data, and
(4) a bit shifting means for obtaining code length s from said code-length-related information, for deleting the s-bit code from the head of said code word string, and for repeating this operation until the occurrence of an end code.

6. A recording medium including recorded coding programs to be executed by a computer for subjecting coded data to variable-length decoding, inverse orthogonal transform and signal format conversion to obtain image data, at the time when said coded data is a code word string subjected to variable-length coding, the maximum code word length per code word of which is n (n: a natural number), said variable-length decoding step comprising:
(1) a step for obtaining j-bit data from the head of said code word string,
(2) a step for referring to a first table by using said obtained j-bit data as an input, for outputting code-length-related information and decoded data from said first table when code length s is j or less, and for outputting code-length-related information and second table access information from said first table when code length s is j+1 or more,
(3) a step for obtaining s-bit data from the head of said code word string, for computing a second table address from said second table access information and said s-bit data, for referring to said second table in accordance with said second table address, and for outputting decoded data, and
(4) a step for obtaining code length s from said code-length-related information, for deleting the s-bit code from the head of said code word string, and for repeating this operation until the occurrence of an end code.

7. A decoding method for subjecting coded data to variable-length decoding, inverse orthogonal transform and signal format conversion to obtain image data, at the time when said coded data is a code word string subjected to variable-length coding, the maximum code word length per code word of which is n (n: a natural number), said variable-length decoding step comprising:
(1) a code word string obtaining step for obtaining j-bit data from the head of said code word string,
(2) an expansion first table reference step, wherein a first table is made reference to by using said obtained j-bit data as an input, and when the sum of the code lengths of k or less continuous code words is j or less, code-length-related information for said k continuous code words and decoded data for each of said k or less continuous code words are output from said first table, and when code length s is j+1 or more, code-length-related information and second table access information are output from said first table, and
(3) a second table reference step for obtaining s-bit data from the head of said code word string, for computing a second table address from said second table access information and said s-bit data, for referring to said second table in accordance with said second table address, and for outputting decoded data.

8. A decoding apparatus comprising a variable-length decoding means for variable-length decoding coded data and a means for carrying out inverse orthogonal transform and signal format conversion by using the result of said decoding to obtain image data, at the time when said coded data is a code word string subjected to variable-length coding, the maximum code word length per code word of which is n (n: a natural number), said variable-length decoding means comprising:
(1) a code word string obtaining means for obtaining j-bit data from the head of said code word string, and an expansion first table reference means, wherein a first table is made reference to by using said obtained j-bit data as an input, and when the sum of the code lengths of k or less continuous code words is j or less, code-length-related information for said k continuous code words and decoded data for each of said k or less continuous code words are output from said first table, and when code length s is j+1 or more, code-length-related information and second table access information are output from said first table, and
(2) a second table referring means for obtaining s-bit data from the head of said code word string, for computing a second table address from said second table access information and said s-bit data, for referring to said second table in accordance with said second table address, and for outputting decoded data.

9. A recording medium including recorded coding programs to be executed by a computer for subjecting coded data to variable-length decoding, inverse orthogonal transform and signal format conversion to obtain image data, at the time when said coded data is a code word string subjected to variable-length coding, the maximum code word length per code word of which is n (n: a natural number), said variable-length decoding step comprising:
(1) a step for obtaining j-bit data from the head of said code word string,
(2) a step, wherein a first table is made reference to by using said obtained j-bit data as an input, and when the sum of the code lengths of k or less continuous code words is j or less, code-length-related information for said k continuous code words and decoded data for each of said k or less continuous code words are output from said first table, and when code length s is j+1 or more, code-length-related information and second table access information are output from said first table, and (3) a step for obtaining s-bit data from the head of said code word string, for computing a second table address from said second table access information and said s-bit data, for referring to said second table in accordance with said second table address, and for outputting decoded data.

10. A decoding method for subjecting coded data to variable-length decoding, inverse orthogonal transform and signal format conversion to obtain image data, at the time when said coded data is a code word string subjected to variable-length coding, the maximum code word length per code word of which is n (n: a natural number), said variable-length decoding step comprising:

(1) a code word string obtaining step for obtaining j-bit data from the head of said code word string, (2) a first table reference step, wherein a first table is referred to by using said obtained j-bit data as an input, when the sum of the code lengths of m or less continuous code words is j or less, and when the sum of the code lengths of said m continuous code words and the code word next to said m continuous code words is determined uniquely, information relating to the total code length of said m continuous code words and the code word next to said m continuous code words, decoded data for each of said m or less continuous code words, and second table access information regarding said code word next to said m continuous code words are output from said first table, and (3) a second table reference step for gaining access to a second table by using said second table access information as an input and for outputting decoded data regarding said code word next to said m continuous code words.

11. A decoding apparatus comprising a variable-length decoding means for variable-length decoding coded data and a means for carrying out inverse orthogonal transform and signal format conversion by using the result of said decoding to obtain image data, at the time when said coded data is a code word string subjected to variable-length coding, the maximum code word length per code word of which is n (n: a natural number), said variable-length decoding means comprising:

(1) a code word string obtaining means for obtaining j-bit data from the head of said code word string, (2) a first table reference means, wherein a first table is referred to by using said obtained j-bit data as an input, when the sum of the code lengths of m or less continuous code words is j or less, and when the sum of the code lengths of said m continuous code words and the code word next to said m continuous code words is determined uniquely, information relating to the total code length of said m continuous code words and the code word next to said m continuous code words, decoded data for each of said m or less continuous code words, and second table access information regarding said code word next to said m continuous code words are output from said first table, and (3) a second table reference means for gaining access to a second table by using said second table access information as an input and for outputting decoded data regarding said code word next to said m continuous code words.

12. A recording medium including recorded coding programs to be executed by a computer for subjecting coded data to variable-length decoding, inverse orthogonal transform and signal format conversion to obtain image data, at the time when said coded data is a code word string subjected to variable-length coding, the maximum code word length per code word of which is n (n: a natural number), said variable-length decoding step comprising:

(1) a step for obtaining j-bit data from the head of said code word string, (2) a step, wherein a first table is referred to by using said obtained j-bit data as an input, when the sum of the code lengths of m or less continuous code words is j or less, and when the sum of the code lengths of said m continuous code words and the code word next to said m continuous code words is determined uniquely, information relating to the total code length of said m continuous code words and the code word next to said m continuous code words, decoded data for each of said m or less continuous code words, and second table access information regarding said code word next to said m continuous code words are output from said first table, and (3) a step for gaining access to a second table by using said second table access information as an input and for outputting decoded data regarding said code word next to said m continuous code words.

13. A decoding method in accordance with claim 1, 4, 7 or 10, wherein said j is a natural number satisfying j<n, and code-length-related information is determined uniquely by inputting at least j bits to said first table.

14. A decoding apparatus in accordance with claim 2, 5, 8 or 11, wherein said j is a natural number satisfying j<n, and code-length-related information is determined uniquely by inputting at least j bits to said first table.

15. A recording medium in accordance with claim 3, 6, 9 or 12, wherein said j is a natural number satisfying j<n, and code-length-related information is determined uniquely by inputting at least j bits to said first table.

16. A decoding method in accordance with claim 1, 4, 7 or 10, wherein, with respect to a variable-length code to be subjected to said variable-length decoding, the code length to be assigned is shorter as data has higher occurrence probability.

17. A decoding apparatus in accordance with claim 2, 5, 8 or 11, wherein, with respect to a variable-length code to be subjected to said variable-length decoding, the code length to be assigned is shorter as data has higher occurrence probability.

18. A recording medium in accordance with claim 3, 6, 9 or 12, wherein, with respect to a variable-length code to be subjected to said variable-length decoding, the code length to be assigned is shorter as data has higher occurrence probability.

19. A decoding method in accordance with claim 1, 4 or 7, wherein, as said second table access information, the mask pattern and offset value of the code word corresponding thereto are output.

20. A decoding apparatus in accordance with claim 2, 5 or 8, wherein, as said second table access information, the mask pattern and offset value of the code word corresponding thereto are output.

21. A recording medium in accordance with claim 3, 6 or 9, wherein, as said second table access information, the mask pattern and offset value of the code word corresponding thereto are output.

22. A decoding method in accordance with claim 10, wherein, as said second table access information, a table access address offset value is output.

23. A decoding apparatus in accordance with claim 11, wherein, as said second table access information, a table access address offset value is output.

24. A recording medium in accordance with claim 12, wherein, as said second table access information, a table access address offset value is output.

25. A decoding method for subjecting coded data to variable-length decoding, said decoding method comprising:
(a) a step for referring to a first table by using j-bit data of said coded data as an input,
(b) a step for, when said j-bit data include at least one continuous code word, outputting at least one information related to said continuous code word from said first table,
(c) a step for, when said j-bit data do not include at least one continuous code word, outputting access information for a second table from said first table, and
(d) a step for referring to said second table based on said access information for said second table, for outputting said information related to said continuous code word, and for obtaining decoding data.

* * * * *